US012058380B2

(12) United States Patent
Wang et al.

(10) Patent No.: US 12,058,380 B2
(45) Date of Patent: Aug. 6, 2024

(54) LEVEL INFORMATION IN VIDEO CODING

(71) Applicant: Bytedance Inc., Los Angeles, CA (US)

(72) Inventors: Ye-kui Wang, San Diego, CA (US); Li Zhang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 121 days.

(21) Appl. No.: 17/953,937

(22) Filed: Sep. 27, 2022

(65) Prior Publication Data
US 2023/0038277 A1 Feb. 9, 2023

Related U.S. Application Data

(63) Continuation of application No. PCT/US2021/023595, filed on Mar. 23, 2021.
(Continued)

(51) Int. Cl.
*H04N 19/70* (2014.01)
*H04N 19/159* (2014.01)
(Continued)

(52) U.S. Cl.
CPC ........... *H04N 19/70* (2014.11); *H04N 19/159* (2014.11); *H04N 19/172* (2014.11); *H04N 19/188* (2014.11); *H04N 19/46* (2014.11)

(58) Field of Classification Search
CPC .... H04N 19/70; H04N 19/503; H04N 19/507; H04N 19/159; H04N 19/16; H04N 19/172; H04N 19/17; H04N 19/174; H04N 19/176; H04N 19/184; H04N 19/177; H04N 19/179; H04N 19/188; H04N 19/187; H04N 19/1883; H04N 19/1887; H04N 19/30; H04N 19/31; H04N 19/33; H04N 19/46; H04N 19/463; H04N 5/77; H04N 5/783; H04N 19/50; H04N 19/48
(Continued)

(56) References Cited

U.S. PATENT DOCUMENTS

2005/0099869 A1* 5/2005 Crinon ................... H04N 19/44
365/222
2005/0135783 A1 6/2005 Crinon
(Continued)

OTHER PUBLICATIONS

Series H: Audiovisual and Multimedia Systems Infrastructure of audiovisual services—Coding of moving video, High efficiency video coding; Recommendation ITU-T H.265 | ISO/IEC 23008-2 (in force edition), Nov. 2019, 712 pages.
(Continued)

*Primary Examiner* — Nathnael Aynalem
(74) *Attorney, Agent, or Firm* — Conley Rose, P.C.

(57) ABSTRACT

Methods and apparatus for video processing are described. The processing may include video encoding, video decoding, or video transcoding. An example video processing method includes performing a conversion between a video and a bitstream of the video including one or more output layer sets according to a format rule. At least one of the one or more output layer sets consists of a trick mode access representation including only intra random access points pictures or only intra-coded pictures. The format rule specifies whether or how level information for the trick mode representation is indicated in the bitstream.

20 Claims, 8 Drawing Sheets

Related U.S. Application Data

(60) Provisional application No. 63/000,941, filed on Mar. 27, 2020, provisional application No. 63/085,107, filed on Sep. 29, 2020.

(51) Int. Cl.
  *H04N 19/169* (2014.01)
  *H04N 19/172* (2014.01)
  *H04N 19/46* (2014.01)

(58) Field of Classification Search
  USPC .......................................... 375/240–240.29
  See application file for complete search history.

(56) References Cited

U.S. PATENT DOCUMENTS

| | | | |
|---|---|---|---|
| 2011/0317771 A1* | 12/2011 | Chen | G11B 27/007 375/E7.027 |
| 2012/0269275 A1 | 10/2012 | Hannuksela | |
| 2013/0272430 A1 | 10/2013 | Sullivan et al. | |
| 2014/0098868 A1* | 4/2014 | Wang | H04N 19/70 375/240.13 |
| 2014/0294062 A1 | 10/2014 | Chen et al. | |
| 2015/0358629 A1* | 12/2015 | Choi | H04N 19/129 375/240.02 |
| 2015/0373361 A1* | 12/2015 | Wang | H04N 19/70 375/240.16 |
| 2016/0191931 A1* | 6/2016 | Hannuksela | H04N 19/105 375/240.12 |
| 2016/0219273 A1* | 7/2016 | Pettersson | H04N 19/58 |
| 2016/0249056 A1 | 8/2016 | Tsukuba | |
| 2017/0064336 A1 | 3/2017 | Zhang et al. | |
| 2017/0111649 A1 | 4/2017 | Wang et al. | |
| 2017/0195670 A1 | 7/2017 | Budagavi | |
| 2018/0199051 A1 | 7/2018 | Hannuksela et al. | |
| 2020/0074503 A1 | 3/2020 | Helle et al. | |
| 2020/0074687 A1 | 3/2020 | Lin et al. | |
| 2020/0077105 A1 | 3/2020 | Hannuksela | |
| 2020/0228843 A1 | 7/2020 | Lin et al. | |
| 2021/0258587 A1 | 8/2021 | Lai | |
| 2022/0286685 A1 | 9/2022 | Hendry | |
| 2023/0007291 A1 | 1/2023 | Samuelsson | |
| 2023/0057986 A1 | 2/2023 | Wang | |

OTHER PUBLICATIONS

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
Document: JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Bossen, F., Retrieved from the Internet: https://vcgit.hhi.fraunhofer.de/jvet/VVCSoftware_VTM.git, VTM software, Oct. 18, 2022, 3 pages.
Document: JVET-R0193-r1, HENDRY, et al., "AHG8/AHG9: On signalling of syntax element max_tid_il_ref_pics_plus1," Joint Video Experts Team (JVET) of ITU-T SG 16 WP 3 and ISO/IEC JTC 1/SC 29/WG 11 18th Meeting: by teleconference, Apr. 15-24, 2020, 6 pages.
Document: JVET-R0046-v4, Lai, C., et al., "AHG8: Temporal sublayer requirements for multi-layer referencing," Joint Video Experts Team (JVET) of ITU-T SG 16 WP 3 and ISO/IEC JTC 1/SC 29/WG 11 18th Meeting: by teleconference, Apr. 15-24, 2020, 5 pages.
Document: JVET-R0266, He, Y., et al., "AHG9: Miscellaneous HLS topics," Joint Video Experts Team (JVET) of ITU-T SG 16 WP 3 and ISO/IEC JTC 1/SC 29/WG 11 18th Meeting: by teleconference, Apr. 15-24, 2020, 5 pages.
"Series H: Audiovisual and Multimedia Systems Infrastructure of audiovisual services—Coding of moving video, Versatile video coding," Recommendation ITU-T H.266 | ISO/IEC 23090-3, Aug. 2020, 516 pages.
Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.
"Series H: Audiovisual and Multimedia Systems Infrastructure of audiovisual services—Coding of moving video, Versatile supplemental enhancement information messages for coded video bitstreams," Recommendation ITU-T Rec. H.274 | ISO/IEC 23002-7, Aug. 2020, 86 pages.
Document: JVET-S2007-v7, Boyce, J., et al., "Versatile supplemental enhancement information messages for coded video bitstreams (Draft 5)," Joint Video Experts Team (JVET) of ITU-T SG 16 WP 3 and ISO/IEC JTC 1/SC 29/WG 11 18th Meeting: by teleconference, Apr. 15-24, 2020, 85 pages.
Communication From A Related Counterpart Application, PCT Application No. PCT/US2021/028979, International Search Report dated Aug. 3, 2021, 18 pages.
Communication From A Related Counterpart Application, PCT Application No. PCT/US2021/028983, International Search Report dated Jul. 21, 2021, 17 pages.
Communication From A Related Counterpart Application, PCT Application No. PCT/US2021/023595, International Search Report dated Jun. 7, 2021, 11 pages.
Document: JVET-R2001-vB, Bross, B., et al. "Versatile Video Coding (Draft 9)," Joint Video Experts Team (JVET) of ITU-T SG 16 WP 3 and ISO/IEC JTC 1/SC 29/ WG 11 18th Meeting: by teleconference, Apr. 15-24, 2020, 530 pages.
Foreign Communication From A Related Counterpart Application, Indian Application No. 202247068089, Indian Office Action dated Feb. 2, 2023, 6 pages.
Non-Final Office Action dated Mar. 8, 2023, 23 pages U.S. Appl. No. 17/975,023, filed Oct. 27, 2022.

* cited by examiner

720

722

Performing a conversion between a video comprising one or more pictures and a bitstream of the video, and wherein the bitstream includes trick mode access representation of the one or more output layer sets according to a format rule, wherein the format rule specifies that the trick mode access representation include only intra random access points pictures, and wherein the format rule specifies whether or how a hypothetical reference decoder is operated.

FIG. 7B

LEVEL INFORMATION IN VIDEO CODING

CROSS REFERENCE TO RELATED APPLICATIONS

This application is a continuation of International Patent Application No. PCT/US2021/023595, filed on Mar. 23, 2021, which claims the priority to and benefits of U.S. Provisional Patent Application No. 63/000,941, filed on Mar. 27, 2020 and of U.S. Provisional Patent Application No. 63/085,107, filed on Sep. 29, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses techniques that can be used by video encoders and decoders for processing coded representation of video using control information useful for decoding of the coded representation.

In one example aspect, a video processing method is disclosed. The method includes performing a conversion between a video comprising one or more output layer sets (OLS) comprising one or more video pictures and a coded representation of the video, wherein the one or more video pictures are coded in the coded representation as intra random access point pictures or intra-coded pictures, wherein the coded representation conforms to a format rule that specifies a location and a type of information that is included in the coded representation for decoding of the one or more video pictures.

In another example aspect, another video processing method is disclosed. The method includes performing a conversion between a video comprising one or more pictures comprising one or more slices that are coded into a coded representation as one or more temporal video layers and the coded representation; wherein the coded representation conforms to a format rule that specifies a constraint on signaling of one or more inter-layer prediction information syntax elements without having to signal a two-dimensional syntax element indicating a maximum temporal layer id of reference pictures used for coding a current video layer and without having to having to directly signal a layer id for the maximum temporal layer id of reference pictures used for coding the current video layer.

In another example aspect, another video processing method is disclosed. The method includes performing a conversion between a video comprising one or more pictures and a coded representation of the video in which each picture is coded as an intra random access picture according to a rule; wherein the rule specifies an operation of a hypothetical reference decoder for the coded representation uses a value of a maximum sublayers to be equal to zero.

In another example aspect, another video processing method is disclosed. The method includes performing a conversion between a video and a bitstream of the video comprising one or more output layer sets according to a format rule, wherein at least one of the one or more output layer sets consist of a trick mode access representation comprising only intra random access points pictures or only intra-coded pictures, and wherein the format rule specifies whether or how level information for the trick mode representation is indicated in the bitstream.

In another example aspect, another video processing method is disclosed. The method includes performing a conversion between a video comprising one or more pictures and a bitstream of the video, wherein the bitstream includes trick mode access representation of the one or more output layer sets according to a format rule, wherein the format rule specifies that the trick mode access representation include only intra random access points pictures, and wherein the format rule specifies whether or how a hypothetical reference decoder is operated.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present disclosure.

BRIEF DESCRIPTION OF DRAWINGS

FIGS. 7A and 7B are flowcharts for an example method of video processing based on some implementations of the disclosed technology.

DETAILED DESCRIPTION

Figure 1:
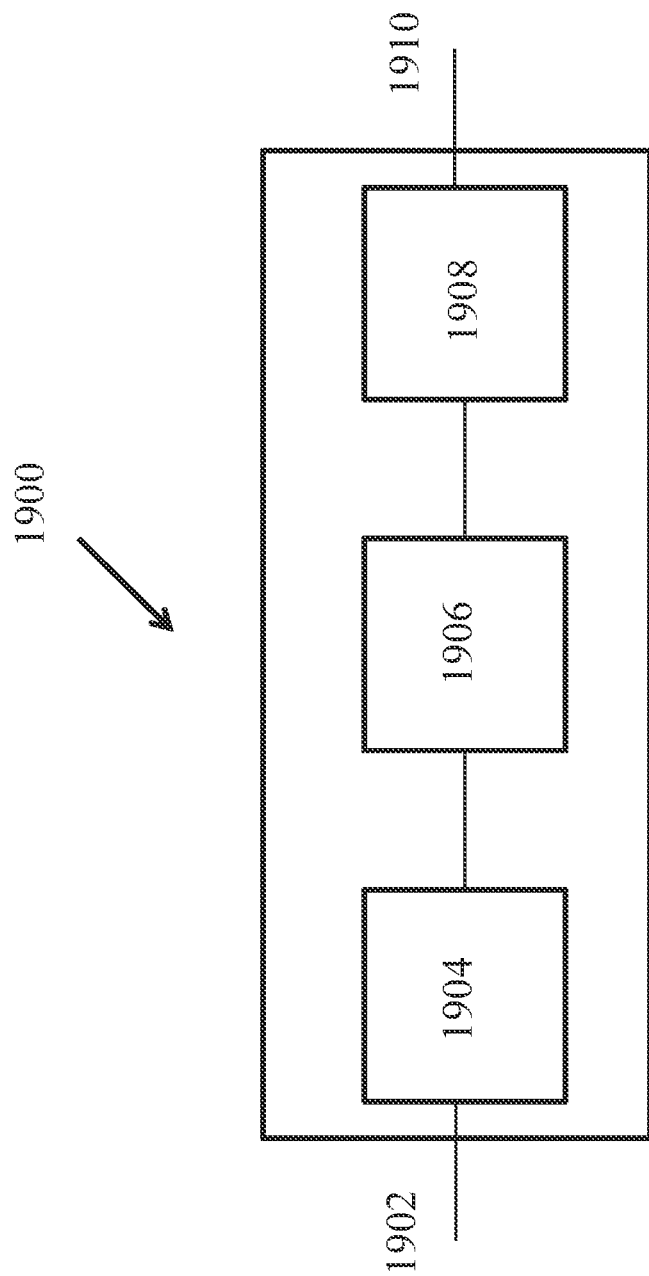
FIG. 1 is a block diagram of an example video processing system.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Initial Discussion

This document is related to video coding technologies. Specifically, it is about signalling of level information for the intra random access point (TRAP) only representation and/or the intra-only representation of a bitstream, signalling of sublayers not used for inter-layer prediction, and signalling of virtual boundaries. The IRAP-only representation of a bitstream is the sub-bitstream that consists of only the IRAP pictures and the associated non-VCL NAL units in the bitstream. The intra-only representation of a bitstream is the sub-bitstream that consists of only the intra-coded pictures and the associated non-VCL NAL units in the bitstream. The ideas may be applied individually or in various combination, to any video coding standard or non-standard video codec that supports multi-layer video coding, e.g., the being-developed Versatile Video Coding (VVC).

2. Abbreviations

ACT adaptive color transform
ALF adaptive loop filter
AMVR adaptive motion vector resolution
APS adaptation parameter set
AU access unit
AUD access unit delimiter
AVC advanced video coding (Rec. ITU-T H.264|ISO/IEC 14496-10)
B bi-predictive
BCW bi-prediction with CU-level weights
BDOF bi-directional optical flow
BDPCM block-based delta pulse code modulation
BP buffering period
CABAC context-based adaptive binary arithmetic coding
CB coding block
CBR constant bit rate
CCALF cross-component adaptive loop filter
CLVS coded layer video sequence
CLVSS coded layer video sequence start
CPB coded picture buffer
CRA clean random access
CRC cyclic redundancy check
CRR cross RAP referencing
CTB coding tree block
CTU coding tree unit
CU coding unit
CVS coded video sequence
CVSS coded video sequence start
DPB decoded picture buffer
DCI decoding capability information
DRAP dependent random access point
DU decoding unit
DUI decoding unit information
EG exponential-Golomb
EGk k-th order exponential-Golomb
EOB end of bitstream
EOS end of sequence
FD filler data
FIFO first-in, first-out
FL fixed-length
GBR green, blue, and red
GCI general constraints information
GDR gradual decoding refresh
GPM geometric partitioning mode
HEVC high efficiency video coding (Rec. ITU-T H.265|ISO/IEC 23008-2)
HRD hypothetical reference decoder
HSS hypothetical stream scheduler
I intra
IBC intra block copy
IDR instantaneous decoding refresh
ILRP inter-layer reference picture
TRAP intra random access point
LFNST low frequency non-separable transform
LPS least probable symbol
LSB least significant bit
LTRP long-term reference picture
LMCS luma mapping with chroma scaling
MIP matrix-based intra prediction
MPS most probable symbol
MSB most significant bit
MTS multiple transform selection
MVP motion vector prediction
NAL network abstraction layer
OLS output layer set
OP operation point
OPI operating point information
P predictive
PH picture header
POC picture order count
PPS picture parameter set
PROF prediction refinement with optical flow
PT picture timing
PU picture unit
QP quantization parameter
RADL random access decodable leading (picture)
RAP random access point
RASL random access skipped leading (picture)
RBSP raw byte sequence payload
RGB red, green, and blue
RPL reference picture list
SAO sample adaptive offset
SAR sample aspect ratio
SEI supplemental enhancement information
SH slice header
SLI subpicture level information
SODB string of data bits
SPS sequence parameter set
STRP short-term reference picture
STSA step-wise temporal sublayer access
TR truncated rice
TU transform unit
VBR variable bit rate
VCL video coding layer
VPS video parameter set
VSEI versatile supplemental enhancement information (Rec. ITU-T H.274|ISO/IEC 23002-7)
VUI video usability information
VVC versatile video coding (Rec. ITU-T H.266|ISO/IEC 23090-3)

3. Video Coding Introduction

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET was later renamed to be the Joint Video Experts Team (JVET) when the Versatile Video Coding (VVC) project officially started. VVC is the new coding standard, targeting at 50% bitrate reduction as compared to HEVC, that has been finalized by the JVET at its 19th meeting ended at Jul. 1, 2020.

The Versatile Video Coding (VVC) standard (ITU-T H.266 ISO/IEC 23090-3) and the associated Versatile Supplemental Enhancement Information (VSEI) standard (ITU-T H.274|ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive three hundred sixty degree (360°) immersive media.

3.1. Profiles, Tier, and Levels

Video coding standards usually specify profiles and levels. Some video coding standards also specify tiers, e.g., HEVC and the being-developed VVC.

Profiles, tiers, and levels specify restrictions on bitstreams and hence limits on the capabilities needed to decode the bitstreams. Profiles, tiers and levels may also be used to indicate interoperability points between individual decoder implementations.

Each profile specifies a subset of algorithmic features and limits that shall be supported by all decoders conforming to that profile. Note that encoders are not required to make use of all coding tools or features supported in a profile, while decoders conforming to a profile are required to support all coding tools or features.

Each level of a tier specifies a set of limits on the values that may be taken by the bitstream syntax elements. The same set of tier and level definitions is usually used with all profiles, but individual implementations may support a different tier and within a tier a different level for each supported profile. For any given profile, a level of a tier generally corresponds to a particular decoder processing load and memory capability.

Capabilities of video decoders conforming to a video codec specification are specified in terms of the ability to decode video streams conforming to the constraints of profiles, tiers and levels specified in the video codec specification. When expressing the capabilities of a decoder for a specified profile, the tier and level supported for that profile should also be expressed.

3.2. Random Access and its Supports in HEVC and VVC

Random access refers to starting access and decoding of a bitstream from a picture that is not the first picture of the bitstream in decoding order. To support tuning in and channel switching in broadcast/multicast and multiparty video conferencing, seeking in local playback and streaming, as well as stream adaptation in streaming, the bitstream needs to include frequent random access points, which are typically intra coded pictures but may also be inter-coded pictures (e.g., in the case of gradual decoding refresh).

HEVC includes signaling of intra random access points (TRAP) pictures in the NAL unit header, through NAL unit types. Three types of TRAP pictures are supported, namely instantaneous decoder refresh (IDR), clean random access (CRA), and broken link access (BLA) pictures. IDR pictures are constraining the inter-picture prediction structure to not reference any picture before the current group-of-pictures (GOP), conventionally referred to as closed-GOP random access points. CRA pictures are less restrictive by allowing certain pictures to reference pictures before the current GOP, all of which are discarded in case of a random access. CRA pictures are conventionally referred to as open-GOP random access points. BLA pictures usually originate from splicing of two bitstreams or part thereof at a CRA picture, e.g., during stream switching. To enable better systems usage of TRAP pictures, altogether six different NAL units are defined to signal the properties of the TRAP pictures, which can be used to better match the stream access point types as defined in the ISO base media file format (ISOBMFF), which are utilized for random access support in dynamic adaptive streaming over HTTP (DASH).

VVC supports three types of TRAP pictures, two types of IDR pictures (one type with or the other type without associated RADL pictures) and one type of CRA picture. These are basically the same as in HEVC. The BLA picture types in HEVC are not included in VVC, mainly due to two reasons: i) The basic functionality of BLA pictures can be realized by CRA pictures plus the end of sequence NAL unit, the presence of which indicates that the subsequent picture starts a new CVS in a single-layer bitstream. ii) There was a desire in specifying less NAL unit types than HEVC during the development of VVC, as indicated by the use of five instead of six bits for the NAL unit type field in the NAL unit header.

Another key difference in random access support between VVC and HEVC is the support of GDR in a more normative manner in VVC. In GDR, the decoding of a bitstream can start from an inter-coded picture and although at the beginning not the entire picture region can be correctly decoded but after a number of pictures the entire picture region would be correct. AVC and HEVC also support GDR, using the recovery point SEI message for signaling of GDR random access points and the recovery points. In VVC, a new NAL unit type is specified for indication of GDR pictures and the recovery point is signaled in the picture header syntax structure. A CVS and a bitstream are allowed to start with a GDR picture. This means that it is allowed for an entire bitstream to contain only inter-coded pictures without a single intra-coded picture. The main benefit of specifying GDR support this way is to provide a conforming behavior for GDR. GDR enables encoders to smooth the bit rate of a bitstream by distributing intra-coded slices or blocks in multiple pictures as opposed intra coding entire pictures, thus allowing significant end-to-end delay reduction, which is considered more important nowadays than before as ultralow delay applications like wireless display, online gaming, drone based applications become more popular.

Another GDR related feature in VVC is the virtual boundary signaling. The boundary between the refreshed region (i.e., the correctly decoded region) and the unrefreshed region at a picture between a GDR picture and its recovery point can be signaled as a virtual boundary, and when signaled, in-loop filtering across the boundary would not be applied, thus a decoding mismatch for some samples at or near the boundary would not occur. This can be useful when the application determines to display the correctly decoded regions during the GDR process.

TRAP pictures and GDR pictures can be collectively referred to as random access point (RAP) pictures.

3.3. Scalable Video Coding (SVC) in General and in VVC

Scalable video coding (SVC, sometimes also just referred to as scalability in video coding) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the base layer or any intervening enhancement layers, and at the same time serve as a RL for one or more enhancement layers above the middle layer. Similarly, in the Multiview or three dimensional (3D) extension of the HEVC standard, there may be multiple views, and information of one view may be utilized to code (e.g., encode or decode) the information of another view (e.g., motion estimation, motion vector prediction and/or other redundancies).

In SVC, the parameters used by the encoder or the decoder are grouped into parameter sets based on the coding level (e.g., video-level, sequence-level, picture-level, slice level, etc.) in which they may be utilized. For example, parameters that may be utilized by one or more coded video sequences of different layers in the bitstream may be included in a video parameter set (VP S), and parameters that are utilized by one or more pictures in a coded video sequence may be included in a sequence parameter set (SPS). Similarly, parameters that are utilized by one or more slices in a picture may be included in a picture parameter set (PPS), and other parameters that are specific to a single slice may be included in a slice header. Similarly, the indication of which parameter set(s) a particular layer is using at a given time may be provided at various coding levels.

Thanks to the support of reference picture resampling (RPR) in VVC, support of a bitstream containing multiple layers, e.g., two layers with standard definition (SD) and high definition (HD) resolutions in VVC can be designed without the need any additional signal-processing-level coding tool, as upsampling needed for spatial scalability support can just use the RPR upsampling filter. Nevertheless, high-level syntax changes (compared to not supporting scalability) are needed for scalability support. Scalability support is specified in VVC version 1. Different from the scalability supports in any earlier video coding standards, including in extensions of AVC and HEVC, the design of VVC scalability has been made friendly to single-layer decoder designs as much as possible. The decoding capability for multi-layer bitstreams are specified in a manner as if there were only a single layer in the bitstream. For example, the decoding capability, such as DPB size, is specified in a manner that is independent of the number of layers in the bitstream to be decoded. Basically, a decoder designed for single-layer bitstreams does not need much change to be able to decode multi-layer bitstreams. Compared to the designs of multi-layer extensions of AVC and HEVC, the high-level syntax (HLS) aspects have been significantly simplified at the sacrifice of some flexibilities. For example, an TRAP AU is required to contain a picture for each of the layers present in the CVS.

A VVC bitstream may consists of one or more output layer sets (OLSs). An OLS is a set of layers for which one or more layers are specified as the output layers. An output layer is a layer that is output after being decoded.

3.4. Parameter Sets

AVC, HEVC, and VVC specify parameter sets. The types of parameter sets include SPS, PPS, APS, and VPS. SPS and PPS are supported in all of AVC, HEVC, and VVC. VPS was introduced since HEVC and is included in both HEVC and VVC. APS was not included in AVC or HEVC but is included in the latest VVC draft text.

SPS was designed to carry sequence-level header information, and PPS was designed to carry infrequently changing picture-level header information. With SPS and PPS, infrequently changing information need not to be repeated for each sequence or picture, hence redundant signalling of this information can be avoided. Furthermore, the use of SPS and PPS enables out-of-band transmission of the important header information, thus not only avoiding the need for redundant transmissions but also improving error resilience.

VPS was introduced for carrying sequence-level header information that is common for all layers in multi-layer bitstreams.

APS was introduced for carrying such picture-level or slice-level information that needs quite some bits to code, can be shared by multiple pictures, and in a sequence there can be quite many different variations.

3.5. Profile, Tier, and Level Syntax and Semantics in VVC

In the latest VVC text (in JVET-Q2001-vE/v15), the PTL syntax and semantics are as follows.

7.3.3.1 General Profile, Tier, and Level Syntax

| profile_tier_level( profileTierPresentFlag, maxNumSubLayersMinus1 ) { | Descriptor |
|---|---|
| if( profileTierPresentFlag ) { | |
|   general_profile_idc | u(7) |
|   general_tier_flag | u(1) |
|   general_constraint_info( ) | |
| } | |
| general_level_idc | u(8) |
| if( profileTierPresentFlag ) { | |
|   num_sub_profiles | u(8) |
|   for( i = 0; i < num_sub_profiles; i++ ) | |
|     general_sub_profile_idc[ i ] | u(32) |
| } | |
| for( i = 0; i < maxNumSubLayersMinus1; i++ ) | |
|   sublayer_level_present_flag[ i ] | u(1) |
| while( !byte_aligned( ) ) | |
|   ptl_alignment_zero_bit | f(1) |
| for( i = 0; i < maxNumSubLayersMinus1; i++ ) | |
|   if( sublayer_level_present_flag[ i ] ) | |
|     sublayer_level_idc[ i ] | u(8) |
| } | |

7.4.4.1 General Profile, Tier, and Level Semantics
A profile_tier_level( ) syntax structure provides level information and, optionally, profile, tier, sub-profile, and general constraints information.
When the profile_tier_level( )) syntax structure is included in a VPS, the OlsInScope is one or more OLSs specified by the VPS. When the profile_tier_level( ) syntax structure is included in an SPS, the OlsInScope is the OLS that includes only the layer that is the lowest layer among the layers that refer to the SPS, and this lowest layer is an independent layer.
general_profile_idc indicates a profile to which OlsInScope conforms as specified in Annex A. Bitstreams shall not contain values of general_profile_idc other than those specified in Annex A. Other values of general_profile_idc are reserved for future use by ITU-T ISO/IEC.
general_tier_flag specifies the tier context for the interpretation of general_level_idc as specified in Annex A.
general_level_idc indicates a level to which OlsInScope conforms as specified in Annex A. Bitstreams shall not contain values of general_level_idc other than those specified in Annex A. Other values of general_level_idc are reserved for future use by ITU-T ISO/IEC.

NOTE 1—A greater value of general_level_idc indicates a higher level. The maximum level signalled in the DCI NAL unit for OlsInScope may be higher than but cannot be lower than the level signalled in the SPS for a CLVS contained within OlsInScope.

NOTE 2—When OlsInScope conforms to multiple profiles, general_profile_idc should indicate the profile that provides the preferred decoded result or the preferred bitstream identification, as determined by the encoder (in a manner not specified in this Specification).

NOTE 3—When the CVSs of OlsInScope conform to different profiles, multiple profile_tier_level( ) syntax structures may be included in the DCI NAL unit such that for each CVS of the OlsInScope there is at least one set of indicated profile, tier, and level for a decoder that is capable of decoding the CVS.

num_sub_profiles specifies the number of the general_sub_profile_idc[i] syntax elements.
general_sub_profile_idc[i] indicates the i-th interoperability metadata registered as specified by Rec. ITU-T T.35, the contents of which are not specified in this Specification.
sublayer_level_present_flag[i] equal to 1 specifies that level information is present in the profile_tier_level( ) syntax structure for the sublayer representation with TemporalId equal to i. sublayer_level_present_flag[i] equal to 0 specifies that level information is not present in the profile_tier_level( )) syntax structure for the sublayer representation with TemporalId equal to i.
ptl_alignment_zero_bits shall be equal to 0.
The semantics of the syntax element sublayer_level_idc[i] is, apart from the specification of the inference of not present values, the same as the syntax element general_level_idc, but apply to the sublayer representation with TemporalId equal to i.
When not present, the value of sublayer_level_idc[i] is inferred as follows:
    sublayer_level_idc[maxNumSubLayersMinus1] is inferred to be equal to general_level_idc of the same profile_tier_level( ) structure,
    For i from maxNumSubLayersMinus1−1 to 0 (in decreasing order of values of i), inclusive, sublayer_level_idc[i] is inferred to be equal to sublayer_level_idc[i+1].

3.6. HRD for IRAP-Only Representation of a Bitstream
One design for supporting of the HRD operations to fully specify the conformance of a sub-bitstream consisting of only the IRAP AUs in a bitstream is described below.
3.6.1. IRAP Only HRD Information SEI Message Syntax

| irap_only_hrd_information( payloadSize ) { | Descriptor |
|---|---|
| irap_only_level_idc | u(5) |
| irap_only_reserved_zero_3bits | u(3) |
| irap_only_max_speed_up_minus100 | u(32) |
| irap_only_general_nal_hrd_params_present_flag | u(1) |
| irap_only_general_vcl_hrd_params_present_flag | u(1) |
| irap_only_cpb_cnt_minus1 | ue(v) |
| for( i = 0; i < irap_only_cpb_cnt_minus1; i++ ) { | |
|   if( irap_only_general_nal_hrd_params_present_flag ){ | |
|     irap_only_nal_bit_rate_value_minus1[ i ] | ue(v) |
|     irap_only_nal_cpb_size_value_minus1[ i ] | ue(v) |
|   } | |
|   if( irap_only_general_vcl_hrd_params_present_flag ){ | |
|     irap_only_vcl_bit_rate_value_minus1[ i ] | ue(v) |
|     irap_only_vcl_cpb_size_value_minus1[ i ] | ue(v) |
|   } | |
| } | |
| } | |

3.6.2. IRAP Only HRD Information SEI Message Semantics
The IRAP only HRD information (IOH) SEI message contains information about the level that sub-bitstream consisting of only IRAP AU sequence in the set of CVSs of the OLSs to which the SEI message applies, denoted as targetCvss, conform to when testing the conformance of the extracted bitstreams containing the IRAP AU sequence according to Annex A. The OLSs to which the IOH message applies are also referred to as the applicable OLSs or the associated OLSs. A CVS in the remainder of this subclause refers to a CVS of the applicable OLSs. An IRAP AU sequence consists of all IRAP AUs within targetCvss.
When an IOH SEI message is present (either being in the bitstream or provided through an external means not specified in this Specification) for any AU of a CVS, an IOH SEI message shall be present for the first AU of the CVS. The IOH SEI message persists in decoding order from the current AU until the next AU containing an IOH SEI message for which the content differs from the current IOH SEI message or the end of the bitstream. All IOH SEI messages that apply to the same CVS shall have the same content.
irap_only_level_idc indicates a level to which the sub-bitstream corresponding to only IRAP AUs of the targetCvss conforms as specified in Annex A. An IRAP only HRD information SEI message shall not contain values of irap_only_level_idc other than those specified in Annex A. Other values of irap_only_level_idc are reserved for future use by ITU-T ISO/IEC.
irap_only_max_speedup_minus100 plus 100 divided by 100 specifies the maximum value of speedup to be applied to the HRD timings of the sub-bitstream corresponding to only IRAP AUs of the targetCvss that still conforms to the indicated irap_only_level_idc. When not present, the value of irap_only_max_speedup is inferred to be 1.
irap_only_general_nal_hrd_params_present_flag equal to 1 specifies that NAL HRD parameters (pertaining to Type II bitstream conformance point) are present in the IRAP only HRD information SEI message. irap_only_general_nal_hrd_ params_present_flag equal to 0 specifies that NAL HRD parameters are not present in the IRAP only HRD information SEI message.
irap_only_general_vcl_hrd_params_present_flag equal to 1 specifies that VCL HRD parameters (pertaining to Type I bitstream conformance point) are present in the IRAP only HRD information SEI message. irap_only_general_vcl_hrd_ params_present_flag equal to 0 specifies that VCL HRD parameters are not present in the IRAP only HRD information SEI message.

irap_only_cpb_cnt_minus1 plus 1 specifies the number of alternative CPB delivery schedules. The value of irap_only_cpb_cnt_minus1 shall be in the range of 0 to 31, inclusive.

It is a requirement of bitstream conformance that irap_only_general_nal_hrd_params_present_flag, irap_only_general_vcl_hrd_params_present_flag and irap_only_cpb_cnt_minus1 are equal to general_nal_hrd_params_present_flag, general_vcl_hrd_params_present_flag and hrd_cpb_cnt_minus1 respectively.

irap_only_nal_bit_rate_value_minus1[i] (together with bit_rate_scale) specifies the input bit rate for the i-th CPB for the sub-bitstream corresponding to IRAP AUs only of the targetCvss when the CPB operates at the AU level. irap_only_nal_bit_rate_value_minus1[i] shall be in the range of 0 to $2^{32}-2$, inclusive. The bit rate in bits per second is given by:

$$\text{BitRate}[\text{maxSubLayer}][i] = (\text{irap\_only\_nal\_bit\_rate\_value\_minus1}[i]+1) * 2^{(6+bit\_rate\_scale)} * \text{speedupFactor}$$

where speedupFactor is value in the range of 1 to irap_only_max_speedup_minus100 plus 100 divided by 100.

irap_only_nal_cpb_size_value_minus1[i] is used together with cpb_size_scale to specify the CPB size for the i-th CPB for the sub-bitstream corresponding to IRAP AUs only of the targetCvss when the CPB operates at the AU level. irap_only_nal_cpb_size_value_minus1[i] shall be in the range of 0 to $2^{32}-2$, inclusive. The CPB size in bits is given by:

$$\text{CpbSize}[\text{maxSubLayer}][i] = (\text{irap\_only\_nal\_cpb\_size\_value\_minus1}[i]+1)*2^{(4+cpb\_size\_scale)}.$$

irap_only_vcl_bit_rate_value_minus1[i] (together with bit_rate_scale) specifies the input bit rate for the i-th CPB for the sub-bitstream corresponding to IRAP AUs only of the targetCvss when the CPB operates at the AU level. irap_only_vcl_bit_rate_value_minus1[i] shall be in the range of 0 to $2^{32}-2$, inclusive. The bit rate in bits per second is given by:

$$\text{BitRate}[\text{maxSubLayer}][i] = (\text{irap\_only\_vcl\_bit\_rate\_value\_minus1}[i]+1)*2^{(6+bit\_rate\_scale)} * \text{speedupFactor}$$

where speedupFactor is value in the range of 1 to irap_only_max_speedup_minus100 plus 100 divided by 100.

irap_only_vcl_cpb_size_value_minus1[i] is used together with cpb_size_scale to specify the CPB size for the i-th CPB for the sub-bitstream corresponding to IRAP AUs only of the targetCvss when the CPB operates at the AU level. irap_only_vcl_cpb_size_value_minus1[i] shall be in the range of 0 to $2^{32}-2$, inclusive. The CPB size in bits is given by:

$$\text{CpbSize}[\text{maxSubLayer}][i] = (\text{irap\_only\_vcl\_cpb\_size\_value\_minus1}[i]+1)*2^{(4+cpb\_size\_scale)}.$$

3.6.3. General SEI Payload Semantics

In the following, the changes are highlighted in bold and italic. Deleted texts are marked with double brackets (e.g., denotes the deletion of the character "a").

The list VclAssociatedSeiList is set to consist of the payloadType values 3, 19, 45, 129, 137, 144, 145, 147 to 150, inclusive, 153 to 156, inclusive, 168, and 204.

The list PicUnitRepConSeiList is set to consist of the payloadType values 0, 1, 19, 45, 129, 133, 137, 147 to 150, inclusive, 153 to 156, inclusive, 168, 203, 204 and 205.

NOTE 4—VclAssociatedSeiList consists of the payloadType values of the SEI messages that, when non-scalable-nested, infer constraints on the NAL unit header of the SEI NAL unit on the basis of the NAL unit header of the associated VCL NAL unit. PicUnitRepConSeiList consists of the payloadType values of the SEI messages that are subject to the restriction on 4 repetitions per PU.

It is a requirement of bitstream conformance that the following restrictions apply on containing of SEI messages in SEI NAL units:

When general_same_pic_timing_in_all_ols_flag is equal to 1, there shall be no SEI NAL unit that contains a scalable-nested SEI message with payloadType equal to 1 (PT), and when an SEI NAL unit contains a non-scalable-nested SEI message with payloadType equal to 1 (PT), the SEI NAL unit shall not contain any other SEI message with payloadType not equal 1.

When an SEI NAL unit contains a non-scalable-nested SEI message with payloadType equal to 0 (BP), 1 (PT), 130 (DUI), 203 (SLI) or 205 (IOH), the SEI NAL unit shall not contain any other SEI message with payloadType not equal to 0, 1, 130, or 203 or 205 (IOH).

When an SEI NAL unit contains a scalable-nested SEI message with payloadType equal to 0 (BP), 1 (PT), 130 (DUI), or 203 (SLI), or 205 (IOH), the SEI NAL unit shall not contain any other SEI message with payloadType not equal to 0, 1, 130, 203, 133 (scalable nesting) or 205 (IOH).

When an SEI NAL unit contains an SEI message with payloadType equal to 3 (filler payload), the SEI NAL unit shall not contain any other SEI message with payloadType not equal to 3.

The following applies on the applicable OLSs or layers of non-scalable-nested SEI messages:

For a non-scalable-nested SEI message, when payloadType is equal to 0 (BP), 1 (PT), 130 (DUI), 203 (SLI), or 205 (IOH) the non-scalable-nested SEI message applies to all the OLSs, when present, that consist of all layers in the current CVS in the entire bitstream. When there is no OLS that consists of all layers in the current CVS the entire bitstream, there shall be no non-scalable-nested SEI message with payloadType equal to 0 (BP), 1 (PT), 130 (DUI), 203 (SLI) or 205 (IOH).

For a non-scalable-nested SEI message, when payloadType is equal to any value among VclAssociatedSeiList, the non-scalable-nested SEI message applies only to the layer for which the VCL NAL units have nuh_layer_id equal to the nuh_layer_id of the SEI NAL unit containing the SEI message.

It is a requirement of bitstream conformance that the following restrictions apply on the value of nuh_layer_id of SEI NAL units:

When a non-scalable-nested SEI message has payloadType equal to any value among VclAssociatedSeiList, the SEI NAL unit containing the non-scalable-nested SEI message shall have nuh_layer_id equal to the value of nuh_layer_id of the VCL NAL unit associated with the SEI NAL unit.

An SEI NAL unit containing a scalable nesting SEI message shall have nuh_layer_id equal to the lowest value of nuh_layer_id of all layers to which the scalable-nested SEI messages apply (when sn_ols_flag of the scalable nesting SEI message is equal to 0) or the lowest value of nuh_layer_id of all layers in the OLSs to which the scalable-nested SEI message apply (when sn_ols_flag of the scalable nesting SEI message is equal to 1).

NOTE 5—Same as for DCI, OPI, VPS, AUD, and EOB NAL units, the value of nuh_layer_id for SEI NAL units that contain non-scalable-nested SEI messages with payloadType equal to 0 (BP), 1 (PT), or 130 (DUI), 203 (SLI) *or 205 (IOH)* is not constrained.

3.6.4. Scalable Nesting SEI Message Semantics

The scalable nesting SEI message provides a mechanism to associate SEI messages with specific OLSs, specific layers, or specific sets of subpictures.

A scalable nesting SEI message contains one or more SEI messages. The SEI messages contained in the scalable nesting SEI message are also referred to as the scalable-nested SEI messages.

It is a requirement of bitstream conformance that the following restrictions apply on containing of SEI messages in a scalable nesting SEI message:

- An SEI message that has payloadType equal to 3 (filler payload) or 133 (scalable nesting) shall not be contained in a scalable nesting SEI message.
- When a scalable nesting SEI message contains a BP, PT, DUI, SLI, *or 205 (IOH)* SEI message, the scalable nesting SEI message shall not contain any other SEI message with payloadType not equal to 0 (BP), 1 (PT), 130 (DUI), 203 (SLI) *or 205 (IOH)*.

It is a requirement of bitstream conformance that the following restriction applies on the value of the nal_unit_type of the SEI NAL unit containing a scalable nesting SEI message:

- When a scalable nesting SEI message contains an SEI message that has payloadType not equal to 132 (decoded picture hash), the SEI NAL unit containing the scalable nesting SEI message shall have nal_unit_type equal to PREFIX_SEI_NUT.
- When a scalable nesting SEI message contains an SEI message that has payloadType equal to 132 (decoded picture hash), the SEI NAL unit containing the scalable nesting SEI message shall have nal_unit_type equal to SUFFIX_SEI_NUT.

sn_ols_flag equal to 1 specifies that the scalable-nested SEI messages apply to specific OLSs. sn_ols_flag equal to 0 specifies that the scalable-nested SEI messages apply to specific layers.

It is a requirement of bitstream conformance that the following restrictions apply on the value of sn_ols_flag:

- When the scalable nesting SEI message contains an SEI message that has payloadType equal to 0 (BP), 1 (PT), 130 (DUI), 203 (SLI), *or 205 (IOH)* the value of sn_ols_flag shall be equal to 1.
- When the scalable nesting SEI message contains an SEI message that has payloadType equal to a value in VclAssociatedSeiList, the value of sn_ols_flag shall be equal to 0.

3.6.5. Proposed (Highlighted) Changes to Annex C:

In the following, the changes are highlighted in bold and italic. Deleted texts are marked with double brackets (e.g., denotes the deletion of the character "a").

C.1 General

For each test, the following ordered steps apply in the order listed, followed by the processes described after these steps in this subclause:

1. An operation point under test, denoted as targetOp, is selected by selecting a target OLS with OLS index opOlsIdx, a highest TemporalId value opTid, *onlyIrapAusFlag* and optionally, a list of target subpicture index values opSubpicIdxList[j] for j from 0 to NumLayersInOls[opOlsIdx]−1, inclusive *and optionally a playback speedup value trickPlaySpeedup*. The value of opOlsIdx is in the range of 0 to TotalNumOlss−1, inclusive. The value of opTid is in the range of 0 to vps_max_sublayers_minus1, inclusive. *The value of speedupFactor is in the range of 1 to irap_only_max_speedup_minus100 plus 100 divided by 100.*

If opSubpicIdxList[ ] is not present, targetOp consists of pictures, and each pair of the selected values of opOlsIdx and opTid shall be such that the sub-bitstream BitstreamToDecode that is the output by invoking the sub-bitstream extraction process as specified in subclause C.6 with entireBitstream, opOlsIdx, opTid, *and onlyIrapAusFlag* as inputs satisfies the following condition:

There is at least one VCL NAL unit with TemporalId equal to opTid in BitstreamToDecode.

Otherwise (opSubpicIdxList[ ] is present), targetOp consists of subpictures, and each set of the selected values of opOlsIdx, opTid, and opSubpicIdxList[j] for j from 0 to NumLayersInOls[opOlsIdx]−1, inclusive, shall be such that the sub-bitstream BitstreamToDecode that is the output by invoking the subpicture sub-bitstream extraction process as specified in subclause C.7 with entireBitstream, opOlsIdx, opTid, opSubpicIdxList[j] for j from 0 to NumLayersInOls[opOlsIdx]−1, inclusive, *and onlyIrapAusFlag*, as inputs satisfies the following conditions:

There is at least one VCL NAL unit with TemporalId equal to opTid in BitstreamToDecode.

There is at least one VCL NAL unit with nuh_layer_id equal to LayerIdInOls[opOlsIdx][j] and sh_subpic_id equal to SubpicIdVal[opSubpicIdxList[j]] for each j in the range of 0 to NumLayersInOls[opOlsIdx]−1, inclusive.

NOTE 1—Regardless of whether opSubpicIdxList[ ] is present, due to the bitstream conformance requirement of each IRAP or GDR AU to be complete, there is at least one VCL NAL unit with nuh_layer_id equal to LayerIdInOls[opOlsIdx][j] for each j from 0 to NumLayersInOls[opOlsIdx]−1, inclusive.

2. If opSubpicIdxList[ ] is not present the following applies:

If the layers in targetOp include all layers in entireBitstream and opTid is equal to the highest TemporalId value among all NAL units in entireBitstream, BitstreamToDecode is set to be identical to entireBitstream.

Otherwise, BitstreamToDecode is set to be the output by invoking the sub-bitstream extraction process as specified in subclause C.6 with entireBitstream, opOlsIdx, and opTid as inputs.

Otherwise (opSubpicIdxList[ ] is present), BitstreamToDecode is set to be the output by invoking the subpicture sub-bitstream extraction process as specified in subclause C.7 with entireBitstream, opOlsIdx, opTid and opSubpicIdxList[j] for j from 0 to NumLayersInOls[opOlsIdx]−1, inclusive, as inputs.

3. The values of TargetOlsIdx and Htid are set equal to opOlsIdx and opTid, respectively, of targetOp.

4. The general_timing_hrd_parameters( ) syntax structure, the ols_timing_hrd_parameters( ) syntax structure, and the sublayer_hrd_parameters( ) syntax structure *or IOH SEI message* applicable to BitstreamToDecode are selected as follows:

If NumLayersInOls[TargetOlsIdx] is equal to 1, the general_timing_hrd_parameters( ) syntax structure and the ols_timing_hrd_parameters( ) syntax structure in the SPS (or provided through an external means not specified in this Specification) are selected. Otherwise, the general_timing_hrd_parameters( ) syntax structure and the vps_ols_timing_hrd_idx[MultiLayerOlsIdx[TargetOlsIdx]]-th ols_timing_hrd_parameters( ) syntax structure in the VPS (or provided through an external means not specified in this Specification) are selected.

*If onlyIrapAusFlag is equal to 0*, within the selected ols_timing_hrd_parameters( ) syntax structure, for testing of the Type I bitstream conformance point, the sublayer_hrd_parameters(Htid) syntax structure that immediately follows the condition "if(general_vcl_hrd_params_present_flag)" is selected and the variable NalHrdModeFlag is set equal to 0, and for testing of the Type II bitstream conformance point, the sublayer_hrd_parameters(Htid) syntax structure that immediately follows the condition "if (general_nal_hrd_params_present_flag)" is selected and the variable NalHrdModeFlag is set equal to 1. When BitstreamToDecode is a Type II bitstream and NalHrdModeFlag is equal to 0, all non-VCL NAL units except the PH and filler data NAL units, and all leading_zero_8 bits, zero byte, start_code_prefix_one_3 bytes and trailing_zero_8 bits syntax elements that form a byte stream from the NAL unit stream (as specified in Annex B), when present, are discarded from BitstreamToDecode and the remaining bitstream is assigned to BitstreamToDecode.

*Otherwise (onlyIrapAusFlag is equal to 1), within the selected IOH SEI message, for testing of the Type I bitstream conformance point, the syntax elements within the condition "if( irap_only_general_vcl_hrd_params_present_flag )" are selected and the variable NalHrdModeFlag is set equal to 0, and for testing of the Type II bitstream conformance point, the sytanx elements within the condition "if(irap_only_general_nal_hrd_params_present_flag )" are selected and the variable NalHrdModeFlag is set equal to 1. When BitstreamToDecode is a Type II bitstream and NalHrdModeFlag is equal to 0, all non-VCL NAL units except the PH and filler data NAL units, and all leading_zero_8bits, zero_byte, start_code_ prefix_one_3bytes and trailing_zero_8bits syntax elements that form a byte stream from the NAL unit stream (as specified in Annex B), when present, are discarded from BitstreamToDecode and the remaining bitstream is assigned to BitstreamToDecode.*

5. An AU associated with a BP SEI message (present in BitstreamToDecode or available through external means not specified in this Specification) applicable to TargetOp is selected as the HRD initialization point and referred to as AU 0.
6. When general_du_hrd_params_present_flag in the selected general_timing_hrd_parameters( ) syntax structure is equal to 1, the CPB is scheduled to operate either at the AU level (in which case the variable DecodingUnitHrdFlag is set equal to 0) or at the DU level (in which case the variable DecodingUnitHrdFlag is set equal to 1). Otherwise, DecodingUnitHrdFlag is set equal to 0 and the CPB is scheduled to operate at the AU level.
7. For each AU in BitstreamToDecode starting from AU 0, the BP SEI message (present in BitstreamToDecode or available through external means not specified in this Specification) that is associated with the AU and applies to TargetOlsIdx is selected, and the PT SEI message (present in BitstreamToDecode or available through external means not specified in this Specification) that is associated with the AU and applies to TargetOlsIdx is selected, and when DecodingUnitHrdFlag is equal to 1 and bp_du_cpb_params_in_pic_timing_sei_flag is equal to 0, the DUI SEI messages (present in BitstreamToDecode or available through external means not specified in this Specification) that are associated with DUs in the AU and apply to TargetOlsIdx are selected.
8. A value of ScIdx is selected. The selected ScIdx shall be in the range of 0 to hrd_cpb_cnt_minus1, inclusive.
9. When the BP SEI message associated with AU 0 has bp_alt_cpb_params_present_flag equal to 0 *or onlyIrapAusFlag is equal to 1*, the variable DefaultInitCpbParamsFlag is set equal to 1. Otherwise, when the BP SEI message associated with AU 0 has bp_alt_cpb_params_present_flag equal to 1, either of the following applies for selection of the initial CPB removal delay and delay offset:
If NalHrdModeFlag is equal to 1, the default initial CPB removal delay and delay offset represented by bp_nal_initial_cpb_removal_delay[Htid][ScIdx] and bp_nal_initial_cpb_removal_offset[Htid][ScIdx], respectively, in the selected BP SEI message are selected. Otherwise, the default initial CPB removal delay and delay offset represented by bp_vcl_initial_cpb_removal_delay[Htid][ScIdx] and bp_vcl_initial_cpb_removal_offset[Htid][ScIdx], respectively, in the selected BP SEI message are selected. The variable DefaultInitCpbParamsFlag is set equal to 1.
If NalHrdModeFlag is equal to 1, the alternative initial CPB removal delay and delay offset represented by bp_nal_initial_cpb_removal_delay[Htid][ScIdx] and bp_nal_initial_cpb_removal_offset[Htid][ScIdx], respectively, in the selected BP SEI message and pt_nal_cpb_alt_initial_removal_delay_delta[Htid][ScIdx] and pt_nal_cpb_alt_initial_removal_offset_delta[Htid][ScIdx], respectively, in the PT SEI message associated with the AU following AU 0 in decoding order are selected. Otherwise, the alternative initial CPB removal delay and delay offset represented by bp_vcl_initial_cpb_removal_delay[Htid][ScIdx] and bp_vcl_initial_cpb_removal_offset[Htid][ScIdx], respectively, in the selected BP SEI message and pt_vcl_cpb_alt_initial_removal_delay_delta[Htid][ScIdx] and pt_vcl_cpb_alt_initial_removal_offset_delta[Htid][ScIdx], respectively, in the PT SEI message associated with the AU following AU 0 in decoding order are selected. The variable DefaultInitCpbParamsFlag is set equal to 0, and one of the following applies:
The RASL AUs that contain RASL pictures with pps_mixed_nalu_types_in_pic_flag equal to 0 and are associated with CRA pictures contained in AU 0 are discarded from BitstreamToDecode and the remaining bitstream is assigned to BitstreamToDecode.

All AUs following AU 0 in decoding order up to an AU associated with a DRAP indication SEI message are discarded from BitstreamToDecode and the remaining bitstream is assigned to BitstreamToDecode.

Each conformance test consists of a combination of one option selected in each of these steps. When there is more than one option for a step, for any particular conformance test only one option is chosen. All possible combinations of all the steps form the entire set of conformance tests. For each operation point under test, the number of bitstream conformance tests to be performed is equal to n0*n1* ( ( 2-n6 ) *n2+n3+n4*( 1-n6 ) +n5*( 1-n6 ) ), where the values of n0, n1, n2, n3, n4, and n5 are specified as follows:

n0 is set equal to 2.

n1 is equal to hrd_cpb_cnt_minus1+1.

n2 is the number of AUs in BitstreamToDecode that each is associated with a BP SEI message applicable to TargetOlsIdx and for which all of the following conditions are true:
  nal_unit_type is equal to CRA_NUT.
  The associated BP SEI message has bp_alt_cpb_params_present_flag equal to 1.
  There is at least one RASL picture with pps_mixed_nalu_types_in_pic_flag equal to 0 associated with the AU.

n3 is the number of IRAP or GDR AUs in BitstreamToDecode that each is associated with a BP SEI message applicable to TargetOlsIdx and for which at least one the following conditions is false:
  nal_unit_type is equal to CRA_NUT.
  The associated BP SEI message has bp_alt_cpb_params_present_flag equal to 1.
  There is at least one RASL picture with pps_mixed_nalu_types_in_pic_flag equal to 0 associated with the AU.

n4 is the number of AUs in BitstreamToDecode that each is associated with a DRAP indication SEI message applicable to TargetOlsIdx and for each of which the associated PT SEI message has pt_cpb_alt_timing_info_present_flag equal to 1.

n5 is derived as follows:
  If general_du_hrd_params_present_flag in the selected general_timing_hrd_parameters( ) syntax structure is equal to 0, n5 is equal to 1.
  Otherwise, n5 is equal to 2.

*n6 is derived as follows:*
  *If an IOH SEI message is*
    *associated with the bitstream, n6 is equal to 1.*
  *Otherwise, n6 is equal to 0.*

NOTE 2—n0 corresponds to conformance tests for Type I bitstream conformance and Type II bitstream conformance. n1 corresponds to conformance tests for each CPB delivery schedule. n2 corresponds to conformance tests for bitstreams starting at each CRA pictures with associated RASL pictures and alternative initial CPB removal delay and delay offset present. These tests are performed twice: once for bitstream keeping and once for bitstreams removing RASL pictures associated with the CRA. n3 corresponds to conformance tests for bitstreams starting at each TRAP or GDR AU that is not a CRA with associated RASL pictures and alternative initial CPB removal delay and delay offset present. n4 corresponds to conformance tests for bitstreams starting with each TRAP with associated DRAP pictures with alternative timing information present and result of removing all AUs between a DRAP picture with alternative timing information present and the preceding TRAP. n5 corresponds to conformance tests for AU based conformance and DU-based when general_du_hrd_params_present_flag is equal to 1.

When BitstreamToDecode is a Type II bitstream, the following applies:
  If *onlyIrapAusFlag is equal to 0 and* the sublayer_hrd_parameters(Htid) syntax structure that immediately follows the condition "if(general_vcl_hrd_params_present_flag)" is selected, the test is conducted at the Type I conformance point shown in FIG. 20, and only VCL and filler data NAL units are counted for the input bit rate and CPB storage.
  Otherwise, if *onlyIrapAusFlag is equal to 0 and* and the sublayer_hrd_parameters(Htid) syntax structure that immediately follows the condition "if(general_nal_hrd_params_present_flag)" is selected, the test is conducted at the Type II conformance point shown in FIG. 20, and all bytes of the Type II bitstream, which could be a NAL unit stream or a byte stream, are counted for the input bit rate and CPB storage.
  *Otherwise, if onlyIrapAusFlag is*
    *equal to 1 and the syntax*
    *elements within the condition*
    *"if( irap_only_general_vcl_hrd_params_*
    *_present_flag )" in the IOH SEI are selected,*
    *the test is conducted at*
    *the Type I conformance point shown*
    *in Figure 20, and only VCL and filler*
    *data NAL units are counted for*
    *the input bit rate and CPB storage.*
  *Otherwise (onlyIrapAusFlag is equal*
    *to 1 and the syntax*
    *elements within the condition*
    *"if( irap_only_general_nal_hrd*
    *params_present_flag )" in the*
    *IOH SEI are|selected), the* test is conducted
    at the Type II conformance point
    shown in Figure 20, and all bytes
    of the Type II bitstream, which could be
    a NAL unit stream or a byte stream,
    are counted for the input bit rate and CPB storage.

NOTE 3—NAL HRD parameters established by a value of ScIdx for the Type II conformance point shown in FIG. 20 are sufficient to also establish VCL HRD conformance for the Type I conformance point shown in FIG. 20 for the same values of InitCpbRemovalDelay[ScIdx], BitRate[Htid][ScIdx] and CpbSize[Htid][ScIdx] for the variable bit rate (VBR) case (cbr_flag[Htid][ScIdx] equal to 0). This is because the data flow into the Type I conformance point is a subset of the data flow into the Type II conformance point and because, for the VBR case, the CPB is allowed to become empty and stay empty until the time a next picture is scheduled to begin to arrive.

For each bitstream conformance test, the CPB size (number of bits) is CpbSize[Htid][ScIdx] as specified in subclause *7.4.6.3 or subclause D.X.2, for*
  *onlyIrapAusFlag equal to 0 and 1,* respectively, where ScIdx and the HRD parameters are specified above in this subclause, and the DPB parameters dpb_max_dec_pic_buffering_minus1[Htid], dpb_max_num_reorder_pics[Htid], and MaxLatencyPictures[Htid] are found in or derived from the dpb_parameters( ) syntax structure that applies to the target OLS as follows:

If NumLayersInOls[TargetOlsIdx] is equal to 1, the dpb_parameters( ) syntax structure is found in the SPS, and the variables PicWidthMaxInSamplesY, PicHeightMaxInSamplesY, MaxChromaFormat, and MaxBitDepthMinus8 are set equal to sps_pic_width_max_in_luma_samples, sps_pic_height_max_in_luma_samples, sps_chroma_format_idc, and sps_bit-depth_minus8, respectively, found in the SPS.

Otherwise (NumLayersInOls[TargetOlsIdx] is greater than 1), the dpb_parameters( ) syntax structure is identified by vps_ols_dpb_params_idx[MultiLayerOlsIdx[TargetOlsIdx]] found in the VPS, and the variables PicWidthMaxInSamplesY, PicHeightMaxInSamplesY, MaxChromaFormat, and MaxBitDepthMinus8 are set equal to vps_ols_dpb_pic_width[MultiLayerOlsIdx[TargetOlsIdx]], vps_ols_dpb_pic_height[MultiLayerOlsIdx[TargetOlsIdx]], vps_ols_dpb_chroma_format[MultiLayerOlsIdx[TargetOlsIdx]], and vps_ols_dpb_bitdepth_minus8[MultiLayerOlsIdx[TargetOlsIdx]], respectively, found in the VPS.

If DecodingUnitHrdFlag is equal to 0, the HRD operates at the AU level and each DU is an AU. Otherwise the HRD operates at the DU level and each DU is a subset of an AU.

NOTE 6—If the HRD operates at the AU level, each time when some bits are removed from the CPB, a DU that is an entire AU is removed from the CPB. Otherwise (the HRD operates at the DU level), each time when some bits are removed from the CPB, a DU that is a subset of an AU is removed from the CPB. Regardless of whether the HRD operates at access unit level or DU level, each time when some picture is output from the DPB, an entire decoded picture is output from the DPB, though the picture output time is derived based on the differently derived CPB removal times and the differently signalled DPB output delays.

The following is specified for expressing the constraints in this annex:

Each AU is referred to as AU n, where the number n identifies the particular AU. AU 0 is selected per step 5 above. The value of n is incremented by 1 for each subsequent AU in decoding order.

Each DU is referred to as DU m, where the number m identifies the particular DU. The first DU in decoding order in AU 0 is referred to as DU 0. The value of m is incremented by 1 for each subsequent DU in decoding order.

NOTE 7—The numbering of DUs is relative to the first DU in AU 0.

Picture n refers to the coded picture or the decoded picture of AU n.

The BIRD operates as follows:

The HRD is initialized at DU 0, with both the CPB and the DPB being set to be empty (the DPB fullness is set equal to 0).

NOTE 8—After initialization, the HRD is not initialized again by subsequent BP SEI messages.

Data associated with DUs that flow into the CPB according to a specified arrival schedule are delivered by the hypothetical stream scheduler (HSS).

The data associated with each DU are removed and decoded instantaneously by the instantaneous decoding process at the CPB removal time of the DU.

Each decoded picture is placed in the DPB.

A decoded picture is removed from the DPB when it becomes no longer needed for inter prediction reference and no longer needed for output.

For each bitstream conformance test, the operation of the CPB is specified in subclause C.2, the instantaneous decoder operation is specified in Clauses 2 through 9, the operation of the DPB is specified in subclause C.3 and the output cropping is specified in subclauses C.3.3 and C.5.2.2.

HSS and BIRD information concerning the number of enumerated delivery schedules and their associated bit rates and buffer sizes is specified in subclauses 7.3.5.1 and 7.4.6.1 *or subclause D.X.2, for only Irap AusFlag equal to 0 and 1, respectively.* The BIRD is initialized as specified by the BP SEI message (specified in subclause D.3). The removal timing of DUs from the CPB and output timing of decoded pictures from the DPB is specified using information in PT SEI messages (specified in subclause D.4) or in DUI SEI messages (specified in subclause D.5). All timing information relating to a specific DU shall arrive prior to the CPB removal time of the DU.

C.2.2 Timing of DU Arrival

The final arrival time for DU m is derived as follows:

```
if( !decodingUnitParamsFlag )
    AuFinalArrivalTime[ m ] = initArrivalTime[ m ] + sizeInbits[ m ] ÷
    BitRate[ onlyIrapAusFlag ? maxSublayer: Htid ][ ScIdx ]   (1584)
else
    DuFinalArrivalTime[ m ] = initArrivalTime[ m ] + sizeInbits[ m ] ÷
    BitRate[ onlyIrapAusFlag ? maxSublayer : Htid ][ ScIdx ]
``` where sizeInbits[m] is the size in bits of DU m, counting the bits of the VCL NAL units, the PH NAL units, and the filler data NAL units for the Type I conformance point or all bits of the Type II bitstream for the Type II conformance point, where the Type I and Type II conformance points are as shown in FIG. 20.

The values of ScIdx, BitRate[*onlyIrapAusFlag ? maxSublayer :* Htid][ScIdx] and CpbSize[*onlyIrapAusFlag ? maxSublayer :* Htid][ScIdx] are constrained as follows:

If the content of the selected general_timing_hrd_parameters( ) syntax structures for the AU containing AU m and the previous AU differ, the HSS selects a value ScIdx1 of ScIdx from among the values of ScIdx provided in the selected general_timing_hrd_parameters( ) syntax structures for the AU containing AU m that results in a BitRate[*onlyIrapAusFlag ? maxSublayer :* Htid][ScIdx1] or CpbSize[*onlyIrapAusFlag ? maxSublayer :* Htid][ScIdx1] for the AU containing AU m. The value of BitRate[*onlyIrapAusFlag ? maxSublayer :* Htid][ScIdx1] or CpbSize[*onlyIrapAusFlag ? maxSublayer :* Htid][ScIdx1] may differ from the value of BitRate[*onlyIrapAusFlag ? maxSublayer :* Htid][ScIdx0] or CpbSize[*onlyIrapAusFlag ? maxSublayer :* Htid][ScIdx0] for the value ScIdx0 of ScIdx that was in use for the previous AU.

Otherwise, the HSS continues to operate with the previous values of ScIdx, BitRate[*onlyIrapAusFlag ? maxSublayer :* Htid][ScIdx] and CpbSize[*onlyIrapAusFlag ? maxSublayer :* Htid][ScIdx].

When the HSS selects values of BitRate[*onlyIrapAusFlag ? maxSublayer :* Htid][ScIdx] or Cpb- Size[*onlyIrapAusFlag* ? *maxSublayer* : Htid][ScIdx] that differ from those of the previous AU, the following applies:

The variable BitRate [*onlyIrapAusFlag* ? *maxSublayer* : Htid][ScIdx] comes into effect at the initial CPB arrival time of the current AU.

The variable CpbSize [*onlyIrapAusFlag* ? *maxSublayer* : Htid][ScIdx] comes into effect as follows:

If the new value of CpbSize [*onlyIrapAusFlag* ? *maxSublayer* : Htid][ScIdx] is greater than the old CPB size, it comes into effect at the initial CPB arrival time of the current AU.

Otherwise, the new value of CpbSize [*onlyIrapAusFlag* ? *maxSublayer* : Htid][ScIdx] comes into effect at the CPB removal time of the current AU.

C.2.3 Timing of DU Removal and Decoding of DU

The nominal removal time of the AU n from the CPB is specified as follows:

If AU n is the AU with n equal to 0 (the AU that initializes the HRD), the nominal removal time of the AU from the CPB is specified by:

$$\text{AuNominalRemovalTime}[0] = \text{InitCpbRemovalDelay}[\text{ScIdx}] \div \textit{speedupFactor} \div 90000 \quad (1585)$$

Otherwise, the following applies:

When AU n is the first AU of a BP that does not initialize the HRD, the following applies:

The nominal removal time of the AU n from the CPB is specified by:

AU n and concatenationFlag and auCpbRemovalDelayDeltaMinus1 are the values of the syntax elements bp_concatenation_flag and bp_cpb_removal_delay_delta_minus1, respectively, in the BP SEI message, selected as specified in subclause C.1, associated with AU n.

After the derivation of the nominal CPB removal time and before the derivation of the DPB output time of access unit n, the variables DpbDelayOffset and CpbDelayOffset are derived as:

If one or more of the following conditions are true, DpbDelayOffset is set equal to the value of the PT SEI message syntax element pt_nal_dpb_delay_offset[Htid] (when NalHrdModeFlag is equal to 1) or pt_vcl_dpb_delay_offset[Htid] (when NalHrdModeFlag is equal to 0) of AU n+1, and CpbDelayOffset is set equal to the value of the PT SEI message syntax element pt_nal_cpb_delay_offset[Htid] (when NalHrdModeFlag is equal to 1) or pt_vcl_cpb_delay_offset[Htid] (when NalHrdModeFlag is equal to 0) of AU n+1, where the PT SEI message containing the syntax elements is selected as specified in subclause C.1:

UseAltCpbParamsFlag for AU n is equal to 1.

DefaultInitCpbParamsFlag is equal to 0.

Otherwise, DpbDelayOffset and CpbDelayOffset are both set equal to 0.

When AU n is not the first AU of a BP, the nominal removal time of the AU n from the CPB is specified by:

```
if( !concatenationFlag ) {
   baseTime = AuNominalRemovalTime[ firstAuInPrevBuffPeriod ]
   tmpCpbRemovalDelay = AuCpbRemovalDelayVal
   tmpCpbDelayOffset = CpbDelayOffset
} else {
   baseTime1 = AuNominalRemovalTime[ prevNonDiscardableAu ]
   tmpCpbRemovalDelay1 = ( auCpbRemovalDelayDeltaMinus1 + 1 )
   baseTime2 = AuNominalRemovalTime [ n − 1 ]
   tmpCpbRemovalDelay2 = Ceil( ( InitCpbRemovalDelay[ ScIdx ] ÷ 90000 +    (1586)
      AuFinalArrivalTime[ n − 1 ] − AuNominalRemovalTime[ n − 1 ] ) ÷ ClockTick )
   if( baseTime1 + ClockTick * tmpCpbRemovalDelay1 <
         baseTime2 + ClockTick * tmpCpbRemovalDelay2 ) {
      baseTime = baseTime2
      tmpCpbRemovalDelay = tmpCpbRemovalDelay2
   } else {
      baseTime = baseTime1
      tmpCpbRemovalDelay = tmpCpbRemovalDelay1
   }
   tmpCpbDelayOffset = 0
}
AuNominalRemovalTime[ n ] = baseTime + ( ClockTick * tmpCpbRemovalDelay ÷ speedupFactor
   − tmpCpbDelayOffset )
``` where AuNominalRemovalTime[firstAuInPrevBuffPeriod] is the nominal removal time of the first AU of the previous BP, AuNominalRemovalTime[prevNonDiscardableAu] is the nominal removal time of the previous AU in decoding order with TemporalId equal to 0 that has at least one picture that has ph_non_ref_pic_flag equal to 0 that is not a RASL or RADL picture, AuCpbRemovalDelayVal is the value of CpbRemovalDelayVal[Htid] derived according to pt_cpb_removal_delay_minus1[Htid] and pt_cpb_removal_delay_delta_idx[Htid] in the PT SEI message, and bp_cpb_removal_delay_delta_val[pt_cpb_removal_delay_delta_idx[Htid]] in the BP SEI message, selected as specified in subclause C.1, associated with $$\text{AuNominalRemovalTime}[n] = \text{AuNominalRemovalTime}[\text{firstAuInCurrBuffPeriod}] + \text{ClockTick} * (\text{AuCpbRemovalDelayVal} - \text{CpbDelayOffset}) \div \textit{speedupFactor} \quad (1587)$$

where AuNominalRemovalTime[firstAuInCurrBuffPeriod] is the nominal removal time of the first AU of the current BP and AuCpbRemovalDelayVal is the value of CpbRemovalDelayVal[OpTid] derived according to pt_cpb_removal_delay_minus1[OpTid] and pt_cpb_removal_delay_delta_idx[OpTid] in the PT SEI message, and bp_cpb_removal_delay_delta_val[pt_cpb_removal_delay_delta_idx[OpTid]] in the BP SEI message, selected as specified in subclause C.1, associated with AU n.

C.6 IRAP AU Sub-Bitstream Extraction Process

Inputs to this process are a bitstream inBitstream, a target OLS index targetOlsIdx, a target highest TemporalId value tIdTarget and a value onlyIrapAusFlag.

Output of this process is a sub-bitstream outBitstream.

The OLS with OLS index targetOlsIdx is referred to as the target OLS.

It is a requirement of bitstream conformance for the input bitstream that any output sub-bitstream that satisfies all of the following conditions shall be a conforming bitstream:
- The output sub-bitstream is the output of the process specified in this subclause with the bitstream, targetOlsIdx equal to an index to the list of OLSs specified by the VPS, and tIdTarget equal to any value in the range of 0 to vps_ptl_max_tid[vps_ols_ptl_idx[targetOlsIdx]], inclusive, as inputs.
- The output sub-bitstream contains at least one VCL NAL unit with nuh_layer_id equal to each of the nuh_layer_id values in LayerIdInOls[targetOlsIdx].
- The output sub-bitstream contains at least one VCL NAL unit with TemporalId equal to tIdTarget.
  NOTE—A conforming bitstream contains one or more coded slice NAL units with TemporalId equal to 0, but does not have to contain coded slice NAL units with nuh_layer_id equal to 0.

The output sub-bitstream OutBitstream is derived by applying the following ordered steps:
1. The bitstream outBitstream is set to be identical to the bitstream inBitstream.
2. Remove from outBitstream all NAL units with TemporalId greater than tIdTarget.
3. Remove from outBitstream all NAL units that have nuh_layer_id not included in the list LayerIdInOls[targetOlsIdx], and are not DCI, OPI, VPS, AUD, or EOB NAL units, and are not SEI NAL units containing non-scalable-nested SEI messages with payload PayloadType equal to 0, 1, 130, or 203.
4. Remove from outBitstream all APS and VCL NAL units for which all of the following conditions are true, and the associated non-VCL NAL units of these VCL NAL units with nal_unit_type equal to PH_NUT or FD_NUT, or with nal_unit_type equal to SUFFIX_SEI_NUT or PREFIX_SEI_NUT and containing SEI messages with PayloadType not equal to any of 0 (BP), 1 (PT), 130 (DUI), and 203 (SLI):
   nal_unit_type is equal to APS_NUT, TRAIL_NUT, STSA_NUT, RADL_NUT, or RASL_NUT, or nal_unit_type is equal to GDR_NUT and the associated ph_recovery_poc_cnt is greater than 0.
   TemporalId is greater than or equal to NumSubLayersInLayerInOLS[targetOlsIdx][GeneralLayerIdx[nuh_layer_id]].
5. *When onlyIrapAusFlag is equal to 1, remove from outBitstream all NAL units of an AU for which the following applies:*
   *NumLayersInOls[ targetOlsIdx ] is equal to 1 and nal_unit_type of all VCL NAL units is not equal to* to *IDR_W_RADL, IDR_NLP and CRA_NUT.*
   *NumLayersInOls[ targetOlsIdx ] is greater than 1 and no AUD NAL unit with aud_irap_or_gdr_flag equal to 1 is present.*
6. When all VCL NAL units of an AU are removed by steps 2, 3, or 4 above and an AUD or OPI NAL unit is present in the AU, remove the AUD or OPI NAL unit from outBitstream.
7. For each OPI NAL unit in outBitstream, set opi_htid_info_present_flag equal to 1, set opi_ols_info_present_flag equal to 1, set opi_htid_plus1 equal to tIdTarget+1, and set opi_ols_idx equal to targetOlsIdx.
8. When an AUD is present in an AU in outBitstream and the AU becomes an IRAP or GDR AU, set aud_irap_or_gdr_flag of the AUD equal to 1.
9. Remove from outBitstream all SEI NAL units that contain a scalable nesting SEI message that has sn_ols_flag equal to 1 and there is no value of i in the range of 0 to sn_num_olss_minus1, inclusive, such that NestingOlsIdx[i] is equal to targetOlsIdx.
10. Remove from outBitstream all SEI NAL units that contain a scalable nesting SEI message that has sn_ols_flag equal to 0 and there is no value in the list NestingLayerId equal to a value in the list LayerIdInOls[targetOlsIdx].
11. When LayerIdInOls[targetOlsIdx] does not include all values of nuh_layer_id in all VCL NAL units in the bitstream inBitstream, the following applies in the order listed:
    a. Remove from outBitstream all SEI NAL units that contain a non-scalable-nested SEI message with payloadType equal to 0 (BP), 130 (DUI), 203 (SLI) *or 205(IOH).*
    b. When general_same_pic_timing_in_all_ols_flag is equal to 0, remove from outBitstream all SEI NAL units that contain a non-scalable-nested SEI message with payloadType equal to 1 (PT).
    c. When outBitstream contains an SEI NAL unit seiNalUnitA that contains a scalable nesting SEI message with sn_ols_flag equal to 1 and sn_subpic_flag equal to 0 that applies to the target OLS, or when NumLayersInOls[targetOlsIdx] is equal to 1 and outBitstream contains an SEI NAL unit seiNalUnitA that contains a scalable nesting SEI message with sn_ols_flag is equal to 0 and sn_subpic_flag equal to 0 that applies to the layer in outBitstream, generate a new SEI NAL unit seiNalUnitB, include it in the PU containing seiNalUnitA immediately after seiNalUnitA, extract the scalable-nested SEI messages from the scalable nesting SEI message and include them directly in seiNalUnitB (as non-scalable-nested SEI messages), and remove seiNalUnitA from outBitstream.

C.7 Subpicture Sub-Bitstream Extraction Process

Inputs to this process are a bitstream inBitstream, a target OLS index targetOlsIdx, a target highest TemporalId value tIdTarget, a list of target subpicture index values subpicIdxTarget[i] for i from 0 to NumLayersInOls[targetOlsIdx]−1, inclusive, *and a value onlyIrapAusFlag.*

Output of this process is a sub-bitstream outBitstream.

The OLS with OLS index targetOlsIdx is referred to as the target OLS. Among the layers in the target OLS, those for which the referenced SPSs have sps_num_subpics_minus1 greater than 0 are referred to as the multiSubpicLayers.

It is a requirement of bitstream conformance for the input bitstream that any output sub-bitstream that satisfies all of the following conditions shall be a conforming bitstream:
- The output sub-bitstream is the output of the process specified in this subclause with the bitstream, targetOlsIdx equal to an index to the list of OLSs specified by the VPS, tIdTarget equal to any value in the range of 0 to vps_max_sublayers_minus1, inclusive, and the list subpicIdxTarget[i] for i from 0 to NumLayersInOls[targetOlsIdx]−1, inclusive, satisfying the following conditions, as inputs:

The value of subpicIdxTarget[i] is equal to a value in the range of 0 to sps_num_subpics_minus1, inclusive, such that sps_subpic_treated_as_pic_flag[subpicIdxTarget[i]] is equal to 1, where sps_num_subpics_minus1 and sps_subpic_treated_as_pic_flag [subpicIdxTarget[i]] are found in or inferred based on the SPS referred to by the layer with nuh_layer_id equal to LayerIdInOls[targetOlsIdx][i].

NOTE 1—When the sps_num_subpics_minus1 for the layer with nuh_layer_id equal to LayerIdInOls[targetOlsIdx][i] is equal to 0, the value of subpicIdxTarget[i] is equal to 0.

For any two different integer values of m and n, when sps_num_subpics_minus1 is greater than 0 for both layers with nuh_layer_id equal to LayerIdInOls[targetOlsIdx][m] and LayerIdInOls[targetOlsIdx][n], respectively, subpicIdxTarget[m] is equal to subpicIdxTarget[n].

The output sub-bitstream contains at least one VCL NAL unit with nuh_layer_id equal to each of the nuh_layer_id values in the list LayerIdInOls[targetOlsIdx].

The output sub-bitstream contains at least one VCL NAL unit with TemporalId equal to tIdTarget.

NOTE 2—A conforming bitstream contains one or more coded slice NAL units with TemporalId equal to 0, but does not have to contain coded slice NAL units with nuh_layer_id equal to 0.

The output sub-bitstream contains at least one VCL NAL unit with nuh_layer_id equal to LayerIdInOls[targetOlsIdx][i] and with sh_subpic_id equal to SubpicIdVal[subpicIdxTarget[i]] for each i in the range of 0 to NumLayersInOls[targetOlsIdx]−1, inclusive.

The output sub-bitstream outBitstream is derived by the following order steps:

a. The sub-bitstream extraction process, specified in Annex C.6, is invoked with inBitstream, targetOlsIdx, tIdTarget *and onlyIrapAusFlag* as inputs and the output of the process is assigned to outBitstream.

4. Technical Problems Solved by Disclosed Technical Solutions

In the intra-only trick mode (for fast forward, for example) used by some applications, the decoder only decodes the TRAP-only representation, which consists of only the TRAP pictures in the bitstream, or only decodes the intra-only representation, which consists of only the intra-coded pictures in the bitstream. However, there lacks a mechanism to signal the level information for the TRAP-only and/or intra-only representation. Knowing the level information would be useful for a decoder to know whether it is capable of consuming a video bitstream at least in trick mode play.

A second problem is as follows. JVET-R0193-v2 proposes to signal max_tid_il_ref_pics_plus1 value separately for each direct reference layer of a layer, i.e. max_tid_il_ref_pics_plus1[i][j] for each direct reference layer j less than i, instead of single max_tid_il_ref_pics_plus1[i] as currently. JVET-R0046 proposes to add a constraint as follows: The picture referred to by each ILRP entry in RefPicList[0] or RefPicList[1] of a slice of the current picture shall be an IRAP picture or have TemporalId less than max_tid_il_ref_pics_plus1[refPicVpsLayerId], with refPicVpsLayerId equal to the nuh_layer_id of the referenced picture. However, the above constraint has two problems. Firstly, the index for max_tid_il_ref_pics_plus1 should be a layer index instead of a layer ID. Secondly, with the JVET-R0193-v2 proposal, the max_tid_il_ref_pics_plus1 syntax element becomes two dimensional.

The third problem is as follows. JVET-R0266 proposes to signal the it is proposed to replace the u(13) coding with ue(v) coding for the virtual boundary position syntax elements sps_virtual_boundaries_pos_x[i], sps_virtual_boundaries_pos_y[i], ph_virtual_boundaries_pos_x[i], and ph_virtual_boundaries_pos_y[i]. However, on the other hand, the minimum allowed value of all these syntax elements is 1. Therefore, it makes more sense to code them with "_minus1" in the syntax element names.

The fourth problem is as follows. In the design for HRD for TRAP-only representation of a bitstream, the variable maxSubLayer is used in many places but is not specified, thus the HRD operations are not clearly specified. For an TRAP AU sequence, since the TemporalId for all the AUs in the sub-bitstream would be equal to 0, the variable should be replaced with the value 0.

The fifth problem is as follows. In the design for HRD for TRAP-only representation of a bitstream, the speedup factor should not be selected for a conformance test, but should rather be signalled in the IOH SEI message, as it is a content property. Once only the TRAP AUs are included in the output of the sub-bitstream extraction process, the speedup factor of the timing compared to the original bitstream is fixed. That means, irap_only_max_speedup_minus100 should be changed to irap_only_speedup_minus100, and the value of SpeedupFactor should be derived to be equal to (irap_only_speedup_minus100+100)/100.

5. Example Embodiments and Solutions

To solve the above problems, and others, methods as summarized below are disclosed. The items should be considered as examples to explain the general concepts and should not be interpreted in a narrow way. Furthermore, these items can be applied individually or combined in any manner.

1) In one example, the level information and/or an indication of the presence of the level information for the TRAP-only representation of each OLS may be signalled in the bitstream. The TRAP-only representation of an OLS consists of only the TRAP pictures and the associated non-VCL NAL units in the bitstream of the OLS.

2) In one example, the level information and/or the indication of the presence of the level information for the intra-only representation of each OLS may be signalled in the bitstream. The intra-only representation of an OLS consists of only the intra-coded pictures and the associated non-VCL NAL units in the bitstream of the OLS.

3) In one example, both the level information and/or the indications of the presence of the level information for the TRAP-only representation and the level information for the intra-only representation of each OLS may be signalled in the bitstream.

4) In one example, the level information and/or the indication(s) of the presence of the level information for the TRAP-only and/or intra-only representation of an OLS may be signalled in one or more of the VPS, the SPS, and the DCI.

a. Alternatively, the level information and/or the indication(s) of the presence of the level information for the TRAP-only and/or intra-only representation of an OLS may be signalled in an SEI message.

i. Alternatively, the level information of an OLS is signalled in an SEI message, and a flag is further signalled in the SEI message to indicate whether the level information is the level information for the TRAP-only representation or for the intra-only representation.
5) In one example, the level information and/or the indication(s) of the presence of the level information for the TRAP-only and/or intra-only representation of an OLS may be signalled in the profile, tier, and level (PTL) syntax structure.
6) In above examples, whether to signal the level information may depend on the indication of the presence(s) of the level information for the TRAP-only and/or intra-only representation.
   a. In one example, two indications (e.g., two flags) are signalled to individually control the presence of the level information for both the TRAP-only and intra-only representations.
      i. Alternatively, furthermore, the level information may be signalled separately for the TRAP-only and intra-only representations.
   b. In one example, when the indication of the presence of the level information for the TRAP-only (and/or intra-only) representation specifies that the level information is present, the level information for the TRAP-only (and/or intra-only) representation is present in the profile_tier_level( ) syntax structure. Otherwise, when the indication of the presence of the level information specifies that the level information is NOT present for the TRAP-only (and/or intra-only) representation, the level information for the TRAP-only (and/or intra-only) representation is NOT present in the profile_tier_level( ) syntax structure
   c. In one example, only one indication (e.g., one flag) is signalled to control the presence of the level information for both the TRAP-only and intra-only representations.
      i. Alternatively, furthermore, the level information may be signalled once for both the TRAP-only and intra-only representations.
7) In another example, HRD parameters (both sequence-level and AU/picture-level) are signalled for each of the TRAP-only representation and/or the intra-only representation, and additionally HRD conformance tests are specified to ensure the conformance of the bitstream of each TRAP-only representation and/or the bitstream of each intra-only representation.
8) To solve the second problem, the following constraint is specified in VVC:
   The reference picture referred to by each ILRP entry in RefPicList[0] or RefPicList[1] of a slice of the current picture shall either be an TRAP picture or have TemporalId less than max_tid_il_ref_pics_plus1[currLayerIdx][refLayerIdx], where currLayerIdx and refLayerIdx are equal to GeneralLayerIdx[nuh_layer_id] and GeneralLayerIdx[refpicLayerId], respectively, and refpicLayerId is the nuh_layer_id of the reference picture.
9) Alternatively, to solve the second problem, the following constraint in VVC:
   The picture referred to by each ILRP entry in RefPicList[0] or RefPicList[1] of a slice of the current picture shall be present in the DPB and shall have nuh_layer_id less than that of the current picture.

is changed to be as follows:
   The picture referred to by each ILRP entry in RefPicList[0] or RefPicList[1] of a slice of the current picture shall be present in the DPB, shall have nuh_layer_id refPicLayerId less than the nuh_layer_id of the current picture, and shall either be an TRAP picture or have TemporalId less than max_tid_il_ref_pics_plus1[currLayerIdx][refLayerIdx], where currLayerIdx and refLayerIdx are equal to GeneralLayerIdx[nuh_layer_id] and GeneralLayerIdx[refpicLayerId], respectively.
10) Alternatively, to solve the second problem, the following constraint is specified in VVC:
    The reference picture referred to by each ILRP entry in RefPicList[0] or RefPicList[1] of a slice of the current picture shall either be an TRAP picture or have TemporalId less than or equal to Max(0, max_tid_il_ref_pics_plus1[currLayerIdx][refLayerIdx]−1), where currLayerIdx and refLayerIdx are equal to GeneralLayerIdx[nuh_layer_id] and GeneralLayerIdx[refpicLayerId], respectively, and refpicLayerId is the nuh_layer_id of the reference picture.
11) Alternatively, to solve the second problem, the following constraint in VVC:
    The picture referred to by each ILRP entry in RefPicList[0] or RefPicList[1] of a slice of the current picture shall be present in the DPB and shall have nuh_layer_id less than that of the current picture.
is changed to be as follows:
The picture referred to by each ILRP entry in RefPicList[0] or RefPicList[1] of a slice of the current picture shall be present in the DPB, shall have nuh_layer_id refpicLayerId less than the nuh_layer_id of the current picture, and shall either be an IRAP picture or have TemporalId less than or equal to Max(0, max_tid_il_ref_pics_plus1[currLayerIdx][refLayerIdx]−1), where currLayerIdx and refLayerIdx are equal to GeneralLayerIdx[nuh_layer_id] and GeneralLayerIdx[refpicLayerId], respectively.
12) To solve the third problem, the following is proposed.
    The virtual boundary position syntax elements sps_virtual_boundaries_pos_x[i], sps_virtual_boundaries_pos_y[i], ph_virtual_boundaries_pos_x[i], and ph_virtual_boundaries_pos_y[i] are renamed to be sps_virtual_boundary_pos_x_minus1[i], sps_virtual_boundary_pos_y_minus1[i], ph_virtual_boundary_pos_x_minus1[i], and ph_virtual_boundary_pos_y_minus1[i], respectively.
    a. Alternatively, furthermore, at least one or all of them are ue(v) coded or u(v) coded.
    b. The semantics of sps_virtual_boundary_pos_x_minus1[i], sps_virtual_boundary_pos_y_minus1[i], ph_virtual_boundary_pos_x_minus1[i], and ph_virtual_boundary_pos_y_minus1[i] are specified as follows:
       sps_virtual_boundary_pos_x_minus1[i] plus 1 specifies the location of the i-th vertical virtual boundary in units of luma samples divided by 8. The value of sps_virtual_boundary_pos_x_minus1[i] shall be in the range of 0 to Ceil(pic_width_max_in_luma_samples÷8)−2, inclusive.
       sps_virtual_boundary_pos_y_minus1[i] plus 1 specifies the location of the i-th horizontal virtual boundary in units of luma samples divided by 8. The value of sps_virtual_boundary_pos_y_minus1[i] shall be in the range of 0 to Ceil(pic_height_max_in_luma_samples÷8)−2, inclusive.

ph_virtual_boundary_pos_x_minus1[i] plus 1 specifies the location of the i-th vertical virtual boundary in units of luma samples divided by 8. The value of ph_virtual_boundary_pos_x_minus1[i] shall be in the range of 0 to Ceil (pic_width_in_luma_samples÷8)−2, inclusive.

The list VirtualBoundariesPosX[i] for i ranging from 0 to NumVerVirtualBoundaries−1, inclusive, in units of luma samples, specifying the locations of the vertical virtual boundaries, is derived as follows:

for (i=0; i<NumVerVirtualBoundaries; i++)

VirtualBoundariesPosX[*i*]=(*sps*_virtual_boundaries_present_flag?(*sps*_virtual_boundary_pos_*x*_ minus1[*i*]+1): *ph*_virtual_boundary_pos_*x*_minus1[*i*]+1))*8     (84)

The distance between any two vertical virtual boundaries shall be greater than or equal to CtbSizeY luma samples.

ph_virtual_boundary_pos_y_minus1[i] plus 1 specifies the location of the i-th horizontal virtual boundary in units of luma samples divided by 8. The value of ph_virtual_boundary_pos_y_ minus1[i] shall be in the range of 0 to Ceil(pic_height_in_luma_samples÷8)−2, inclusive.

The list VirtualBoundariesPosY[i] for i ranging from 0 to NumHorVirtualBoundaries−1, inclusive, in units of luma samples, specifying the locations of the horizontal virtual boundaries, is derived as follows:

for (i=0; i<NumHorVirtualBoundaries; i++)

VirtualBoundariesPosY[*i*]=(*sps*_virtual_boundaries_present_flag?(*sps*_virtual_boundary_pos_*y*_ minus1[*i*]+1): (*ph*_virtual_boundary_pos_*y*_minus1[*i*]+1))*8     (86)

The distance between any two horizontal virtual boundaries shall be greater than or equal to CtbSizeY luma samples.

13) How to signal the number of horizontal virtual boundaries (e.g., ph_num_hor_virtual_boundaries in PH/sps_num_hor_virtual_boundaries in SPS) and/or the value range of the number of horizontal virtual boundaries may depend on the number of vertical virtual boundaries (e.g., ph_num_ver_virtual_boundaries/sps_num_ver_virtual_boundaries in SPS).

a. In one example, when the number of vertical virtual boundaries is equal to 0, instead of signalling the number of horizontal virtual boundaries, the number of horizontal virtual boundaries minus 1 may be signalled.
  b. Alternatively, when the number of vertical virtual boundaries is equal to 0, the number of horizontal virtual boundaries may be in the range of [1, Ceil (pic_height_in_luma_samples÷8)−1]. Otherwise, it may be in the range of [0, Ceil(pic_height_in_luma_samples÷8)−1].

14) Whether to signal and/or how to signal disabling in-loop filtering across virtual boundaries applied in the coded pictures in the CLVS (e.g., sps_virtual_boundaries_enabled_flag) and/or the number of horizontal/vertical virtual boundaries (e.g., sps_num_hor_virtual_ boundaries/sps_num_ver_virtual_boundaries) in SPS may depend on the layout of subpictures.

a. In one example, whether to signal sps_virtual_boundaries_enabled_flag is dependent on whether there are more than 1 subpicture.
    i. In one example, only when there are more than 1 subpicture, sps_virtual_boundaries_enabled_flag may be signalled.
    ii. Alternatively, furthermore, when sps_virtual_boundaries_enabled_flag is not present, it is inferred to be 0.
  b. In one example, the control of disabling in-loop filtering across virtual boundaries applied to a subpicture may be indicated in the bitstream instead of disabling in-loop filtering across virtual boundaries applied to all the coded pictures in the CLVS.
    i. In one example, suppose there are N subpictures, and then N controlling flags may be signalled, and each flag is subpicture-specific.

15) To solve the fourth problem, in the design for HRD for TRAP-only representation of a bitstream, all occurrences of the variable maxSubLayer is replaced with the value 0.

16) To solve the fifth problem, in the design for HRD for TRAP-only representation of a bitstream, the speedup factor is not selected for a conformance test, but rather is signalled in the IOH SEI message.

a. In one example, the irap_only_max_speedup_minusM (e.g., M=100) syntax element in the IOH SEI message syntax is changed to irap_only_speedup_minusM, and the value of SpeedupFactor is derived to be equal to (irap_only_speedup_minusM+M)/M.
  b. In one example, a constraint is added that (irap_only_speedup_minusM+M) shall be no smaller than $2^K-1$ (e.g., K=32 or K is dependent on how the syntax is signalled).
  c. In one example, instead of signalling irap_only_speedup_minusM (e.g., M=100), a syntax element named irap_only_speedup may be directly signaled which specifies the maximum value of speedup to be applied to the HRD timings of the sub-bitstream corresponding to the TRAP AU sequence of the targetCvss that still conforms to the indicated irap_only_level_idc.
    i. In one example, irap_only_speedup is signaled with u(k) (e.g., k=32).
    ii. In one example, the signaled value of irap_only_speedup shall be no smaller than 100.
    iii. In one example, when irap_only_speedup is not present, it is inferred to be equal to 100.
    iv. Alternatively, furthermore, the value of SpeedupFactor is derived to be equal to (irap_only_speedup_minus+offset)/M.
      1. In one example, offset is set to 0.
      2. In one example, offset is set to (M/2).

6. EMBODIMENTS

Below are some example embodiments for some of the aspects summarized above in Section 5, which can be applied to the VVC specification. The changed texts are based on the latest VVC text in JVET-Q2001-vE/v15. Most relevant parts that have been added or modified are highlighted in *boldface italics,* and some of the deleted parts are, marked with double brackets (e.g., [[a]] denotes the deletion of the character "a"). There are some other changes that are editorial in nature and thus not highlighted.

6.1. First Embodiment

This embodiment is for items 1, 4, and 5.
7.3.3.1 General Profile, Tier, and Level Syntax

| profile_tier_level( profileTierPresentFlag, maxNumSubLayersMinus1 ) { | Descriptor |
|---|---|
|   if( profileTierPresentFlag ) { | |
|     general_profile_idc | u(7) |
|     general_tier_flag | u(1) |
|     general_constraint_info( ) | |
|   } | |
|   general_level_idc | u(8) |
|   if( profileTierPresentFlag ) { | |
|     num_sub_profiles | u(8) |
|     for( i = 0; i < num_sub_profiles; i++ ) | |
|       general_sub_profile_idc[ i ] | u(32) |
|   } | |
|   for( i = 0; i <= maxNumSubLayersMinus1; i++ ) | |
|     sublayer_level_present_flag[ i ] | u(1) |
|   while( !byte_aligned( ) ) | |
|     ptl_alignment_zero_bit | f(1) |
|   for( i = 0; i <= maxNumSubLayersMinus1; i++ ) | |
|     if( sublayer_level_present_flag[ i ] ) | |
|       sublayer_level_idc[ i ] | u(8) |
| } | |

7.4.4.1 General Profile, Tier, and Level Semantics sublayer_level_present_flag[i] equal to 1, *when i is greater than 0,* specifies that level information is present in the profile_tier_level( ) syntax structure for the sublayer representation with TemporalId equal to *i -1, and, when i is equal to 0, specifies that level information is present in the profile_tier_level( ) syntax structure for the IRAP-only representation that consists of only the IRAP pictures and the associated non-VCL NAL units.* sublayer_level_present_flag[i] equal to 0, *when i is greater than 0,* specifies that level information is not present in the profile_tier_level( ) syntax structure for the sublayer representation with TemporalId equal to i- 1, *and, when i is equal to 0, specifies that level information is not present in the profile_tier_level( ) syntax structure for the IRAP-only representation.*
ptl_alignment_zero_bits shall be equal to 0.
The semantics of the syntax element sublayer_level_idc[i] is, apart from the specification of the inference of not present values, the same as the syntax element general_level_idc, but apply to the sublayer representation with TemporalId equal to i-*1 when i is greater than 0, and apply to the IRAP-only representation when i is equal to 0.*
When not present, the value of sublayer_level_idc[i] is inferred as follows:

sublayer_level_idc[maxNumSubLayersMinus1+1] is inferred to be equal to general_level_idc of the same profile_tier_level( ) structure, For i from maxNumSubLayersMinus1-1 to 0 (in decreasing order of values of i), inclusive, sublayer_level_idc [i] is inferred to be equal to sublayer_level_idc[i+1].

A.1 Overview of Profiles, Tiers and Levels

For each operation point identified by TargetOlsIdx and Htid, the profile, tier, and level information is indicated through general_profile_idc and general_tier_flag in the VPS, and sublayer_level_idc[Htid+1] found in or derived from the VPS.

When no VPS is available, the profile and tier information is indicated through general_profile_idc and general_tier_flag in the SPS, and the level information is indicated as follows:

- If Htid is provided by external means indicating the highest TemporalId of any NAL unit in the bitstream, level information is indicated through sublayer_level_idc[Htid+ *1*] found in or derived from the SPS.
- Otherwise (Htid is not provided by external means), level information is indicated through general_level_idc in the SPS.

6.2. Second Embodiment

This embodiment is for items 3, 4, and 5.
7.3.3.1 General Profile, Tier, and Level Syntax

| profile_tier_level( profileTierPresentFlag, maxNumSubLayersMinus1 ) { | Descriptor |
|---|---|
|   if( profileTierPresentFlag ) { | |
|     general_profile_idc | u(7) |
|     general_tier_flag | u(1) |
|     general_constraint_info( ) | |
|   } | |
|   general_level_idc | u(8) |
|   if( profileTierPresentFlag ) { | |
|     num_sub_profiles | u(8) |
|     for( i = 0; i < num_sub_profiles; i++ ) | |
|       general_sub_profile_idc[ i ] | u(32) |
|   } | |
|   for( i = 0; i <= maxNumSubLayersMinus1 + 1, i++ ) | |
|     sublayer_level_present_flag[ i ] | u(1) |

| profile_tier_level( profileTierPresentFlag, maxNumSubLayersMinus1 ) { | Descriptor |
|---|---|
|   while( !byte_aligned( ) ) | |
|     ptl_alignment_zero_bit | f(1) |
|   for( i = 0; i <= maxNumSubLayersMinus1 + 1, i++ ) | |
|     if( sublayer_level_present_flag[ i ] ) | |
|       sublayer_level_idc[ i ] | u(8) |
| } | |

7.4.4.1 General Profile, Tier, and Level Semantics
sublayer_level_present_flag[i] equal to 1, *when i is greater than 1,* specifies that level information is present in the profile_tier_level( ) syntax structure for the sublayer representation with TemporalId equal to i−2; *when i is equal to 1, specifies that level information is present in the profile_tier_level( ) syntax structure for the intra-only representation that consists of only the intra-coded pictures and the associated non-VCL NAL unit; and when i is equal to 0, specifies that level information is present in the profile_tier_level( ) syntax structure for the IRAP-only representation that consists of only the IRAP pictures and the associated non-VCL NAL units.* sublayer_level_present_flag[i] equal to 0, *when i is greater than 1,* specifies that level information is not present in the profile_tier_level( ) syntax structure for the sublayer representation with TemporalId equal to i−2; *when i is equal to 1, specifies that level information is not present in the profile_tier_level( ) syntax structure for the intra-only representation; and when i is equal to 0, specifies that level information is not present in the profile_tier_level( ) syntax structure for the IRAP-only representation.*
ptl_alignment_zero_bits shall be equal to 0.
The semantics of the syntax element sublayer_level_idc[i] is, apart from the specification of the inference of not present values, the same as the syntax element general_level_idc, but apply to the sublayer representation with TemporalId equal to i−2 *when i is greater than 1, apply to the intra-only representation when i is equal to 1, and apply to the IRAP-only representation when i is equal to 0.*
When not present, the value of sublayer_level_idc[i] is inferred as follows:
    sublayer_level_idc[maxNumSubLayersMinus1+2] is inferred to be equal to general_level_idc of the same profile_tier_level( ) structure,
    For i from maxNumSubLayersMinus1−1 to 0 (in decreasing order of values of i), inclusive, sublayer_level_idc[i] is inferred to be equal to sublayer_level_idc[i+1].
A.1 Overview of Profiles, Tiers and Levels
For each operation point identified by TargetOlsIdx and Htid, the profile, tier, and level information is indicated through general_profile_idc and general_tier_flag in the VPS, and sublayer_level_idc[Htid+2] found in or derived from the VPS.
When no VPS is available, the profile and tier information is indicated through general_profile_idc and general_tier_flag in the SPS, and the level information is indicated as follows:

If Htid is provided by external means indicating the highest TemporalId of any NAL unit in the bitstream, level information is indicated through sublayer_level_idc[Htid+2] found in or derived from the SPS.
    Otherwise (Htid is not provided by external means), level information is indicated through general_level_idc in the SPS.

6.3. Third Embodiment

This embodiment is for items 15 and 16. The text changes are in relative to the design for HRD for IRAP-only representation of a bitstream in Section 3.7 of this document.

6.3.1. IRAP Only HRD Information SEI Message Syntax

| irap_only_hrd_information( payloadSize) { | Descriptor |
|---|---|
|   irap_only_level_idc | u(5) |
|   irap_only_reserved_zero_3bits | u(3) |
|   [[irap_only_max_speedup_minus100]] | [[u(32)]] |
|   *irap_only_speedup_minus100* | *u(32)* |
|   irap_only_general_nal_hrd_params_present flag | u(1) |
|   irap_only_general_vcl_hrd_params_present flag | u(1) |
|   irap_only_cpb_cnt_minus1 | ue(v) |
|   for( i = 0; i < irap_only_cpb_cnt_minus1; i++ ) { | |
|     if( irap_only_general_nal_hrd_params_present_flag ){ | |
|       irap_only_nal_bit_rate_value_minus1[ i ] | ue(v) |
|       irap_only_nal_cpb_size_value_minus1[ i ] | ue(v) |
|     } | |
|     if( irap_only_general_vcl_hrd_params_present flag ){ | |
|       irap_only_vcl_bit_rate_value_minus1[ i ] | ue(v) |
|       irap_only_vcl_cpb_size_value_minus1[ i ] | ue(v) |
|     } | |
|   } | |
| } | |

6.3.2. IRAP Only HRD Information SEI Message Semantics
The IRAP only HRD information (IOH) SEI message contains information about the level that the sub-bitstream consisting of only the IRAP AU sequence in the set of CVSs of the OLSs to which the SEI message applies, denoted as targetCvss, conform to when testing the conformance of the extracted bitstreams containing the IRAP AU sequence according to Annex A. The OLSs to which the IOH message applies are also referred to as the applicable OLSs or the associated OLSs. A CVS in the remainder of this subclause refers to a CVS of the applicable OLSs. An IRAP AU sequence consists of all IRAP AUs within targetCvss.
When an IOH SEI message is present (either being in the bitstream or provided through an external means not specified in this Specification) for any AU of a CVS, an IOH SEI message shall be present for the first AU of the CVS. The IOH SEI message persists in decoding order from the current AU until the next AU containing an IOH SEI message for which the content differs from the current IOH SEI message or the end of the bitstream. All IOH SEI messages that apply to the same CVS shall have the same content.

irap_only_level_idc indicates a level, as specified in Annex A, to which the sub-bitstream corresponding to the IRAP AU sequence of the targetCvss conforms. An IOH SEI message shall not contain values of irap_only_level_idc other than those specified in Annex A. Other values of irap_only_level_idc are reserved for future use by ITU-T ISO/IEC.

irap_only[_max]_speedup_minus100 plus 100 divided by 100 specifies the value of speedup to be applied to the HRD timings of the sub-bitstream corresponding to *the IRAP AU sequence* of the targetCvss that conforms to the indicated irap_only_level_idc. When not present, the value of irap_only_speedup is inferred to be 1.

*The variable SpeedupFactor is derived to be equal to ( irap_only_speedup_ minus100 + 100 ) / 100.* irap_only_general_nal_hrd_params_present_flag equal to 1 specifies that NAL HRD parameters (pertaining to Type II bitstream conformance point) are present in the IOH SEI message. irap_only_general_nal_hrd_params_present_flag equal to 0 specifies that NAL HRD parameters are not present in the IOH SEI message.

irap_only_general_vcl_hrd_params_present_flag equal to 1 specifies that VCL HRD parameters (pertaining to Type I bitstream conformance point) are present in the IOH SEI message. irap_only_general_vcl_hrd_params_present_flag equal to 0 specifies that VCL HRD parameters are not present in the IOH SEI message.

irap_only_cpb_cnt_minus1 plus 1 specifies the number of alternative CPB delivery schedules. The value of irap_only_cpb_cnt_minus1 shall be in the range of 0 to 31, inclusive.

It is a requirement of bitstream conformance that irap_only_general_nal_hrd_params_present_flag, irap_only_general_vcl_hrd_params_present_flag and irap_only_cpb_cnt_minus1 are equal to general_nal_hrd_params_present_flag, general_vcl_hrd_params_present_flag and hrd_cpb_cnt_minus1 respectively.

irap_only_nal_bit_rate_value_minus1[i] (together with bit_rate_scale) specifies the input bit rate for the i-th CPB for the sub-bitstream corresponding to the IRAP AU sequence of the targetCvss when the CPB operates at the AU level. irap_only_nal_bit_rate_value_minus1[i] shall be in the range of 0 to $2^{32}-2$, inclusive. The bit rate in bits per second is given by:

*BitRate[ 0 ][ i ] =*
*( irap_only_nal_bit_rate_value_*
*minus1[ i ] + 1 ) * $2^{(6 + bit\_rate\_scale)}$*
*\* SpeedupFactor* irap_only_nal_cpb_size_value_minus1[i] (together with cpb_size_scale) specifies the CPB size for the i-th CPB for the sub-bitstream corresponding to the IRAP AU sequence of the targetCvss when the CPB operates at the AU level. irap_only_nal_cpb_size_value_minus1[i] shall be in the range of 0 to $2^{32}-2$, inclusive. The CPB size in bits is given by:

*CpbSize[ 0 ][ i ] =*
*( irap_only_nal_cpb_size_*
*value_minus1[ i ] + 1 )*
*\* $2^{(4 + cpb\_size\_scale)}$.* irap_only_vcl_bit_rate_value_minus1[i] (together with bit_rate_scale) specifies the input bit rate for the i-th CPB for the sub-bitstream corresponding to the IRAP AU sequence of the targetCvss when the CPB operates at the AU level. irap_only_vcl_bit_rate_value_minus1[i] shall be in the range of 0 to $2^{32}-2$, inclusive. The bit rate in bits per second is given by:

*BitRate[ 0 ][ i ] =*
*( irap_only_vcl_bit_rate_*
*value_minus1[ i ] + 1 )*
*\* $2^{(6 + bit\_rate\_scale)}$ \* SpeedupFactor* irap_only_vcl_cpb_size_value_minus1[i] (together with cpb_size_scale) specifies the CPB size for the i-th CPB for the sub-bitstream corresponding to the IRAP AU sequence of the targetCvss when the CPB operates at the AU level. irap_only_vcl_cpb_size_value_minus1[i] shall be in the range of 0 to $2^{32}-2$, inclusive. The CPB size in bits is given by:

*CpbSize[ 0 ][ i ] =*
*( irap_only_vcl_cpb_size_*
*value_minus1[ i ] + 1 )*
*\* $2^{(4 + cpb\_size\_scale)}$.*

6.3.3. Proposed (Highlighted) Changes to Annex C:

C.1 General

For each test, the following ordered steps apply in the order listed, followed by the processes described after these steps in this subclause:

1. An operation point under test, denoted as targetOp, is selected by selecting a target OLS with OLS index opOlsIdx, a highest TemporalId value opTid, onlyIrapAusFlag and optionally, a list of target subpicture index values opSubpicIdxList[j] for j from 0 to NumLayersInOls[opOlsIdx]−1, inclusive. The value of opOlsIdx is in the range of 0 to TotalNumOlss−1, inclusive. The value of opTid is in the range of 0 to vps_max_sublayers_minus1, inclusive.

If opSubpicIdxList[ ] is not present, targetOp consists of pictures, and each pair of the selected values of opOlsIdx and opTid shall be such that the sub-bitstream BitstreamToDecode that is the output by invoking the sub-bitstream extraction process as specified in subclause C.6 with entireBitstream, opOlsIdx, opTid, and onlyIrapAusFlag as inputs satisfies the following condition:
   There is at least one VCL NAL unit with TemporalId equal to opTid in BitstreamToDecode.

Otherwise (opSubpicIdxList[ ] is present), targetOp consists of subpictures, and each set of the selected values of opOlsIdx, opTid, and opSubpicIdxList[j] for j from 0 to NumLayersInOls[opOlsIdx]−1, inclusive, shall be such that the sub-bitstream BitstreamToDecode that is the output by invoking the subpicture sub-bitstream extraction process as specified in subclause C.7 with entireBitstream, opOlsIdx, opTid, opSubpicIdxList[j] for j from 0 to NumLayersInOls[opOlsIdx]−1, inclusive, and onlyIrapAusFlag, as inputs satisfies the following conditions:
   There is at least one VCL NAL unit with TemporalId equal to opTid in BitstreamToDecode.
   There is at least one VCL NAL unit with nuh_layer_id equal to LayerIdInOls[opOlsIdx][j] and sh_subpic_id equal to SubpicIdVal[opSubpicIdxList[j]] for each j in the range of 0 to NumLayersInOls[opOlsIdx]−1, inclusive.

NOTE 1—Regardless of whether opSubpicIdxList[ ] is present, due to the bitstream conformance requirement of each IRAP or GDR AU to be complete, there is at least one VCL NAL unit with nuh_layer_id equal to LayerIdInOls[opOlsIdx][j] for each j from 0 to NumLayersInOls[opOlsIdx]−1, inclusive.

C.2.2 Timing of DU Arrival

The final arrival time for DU m is derived as follows:

```
if( !decodingUnitParamsFlag )
   AuFinalArrivalTime[ m ] = initArrivalTime[ m ] + sizeInbits[ m ] ÷
   BitRate[ onlyIrapAusFlag ? 0 : Htid ][ ScIdx ]          (1584)
else
   DuFinalArrivalTime[ m ] = initArrivalTime[ m ] + sizeInbits[ m ] ÷
   BitRate[ onlyIrapAusFlag ? 0 : Htid ][ ScIdx ]
``` where sizeInbits[m] is the size in bits of DU m, counting the bits of the VCL NAL units, the PH NAL units, and the filler data NAL units for the Type I conformance point or all bits of the Type II bitstream for the Type II conformance point, where the Type I and Type II conformance points are as shown in FIG. 20.

The values of ScIdx, BitRate[onlyIrapAusFlag? *0*: Htid][ScIdx] and CpbSize[onlyIrapAusFlag? *0*: Htid][ScIdx] are constrained as follows:

If the content of the selected general_timing_hrd_parameters( ) syntax structures for the AU containing AU m and the previous AU differ, the HSS selects a value ScIdx1 of ScIdx from among the values of ScIdx provided in the selected general_timing_hrd_parameters( ) syntax structures for the AU containing AU m that results in a BitRate[onlyIrapAusFlag? *0*: Htid][ScIdx1] or CpbSize[onlyIrapAusFlag? *0*: Htid][ScIdx1] for the AU containing AU m. The value of BitRate[onlyIrapAusFlag? *0*: Htid][ScIdx1] or CpbSize[onlyIrapAusFlag? *0*: Htid][ScIdx1] may differ from the value of BitRate[onlyIrapAusFlag? *0*: Htid][ScIdx0] or CpbSize[onlyIrapAusFlag? 0: Htid][ScIdx0] for the value ScIdx0 of ScIdx that was in use for the previous AU.

Otherwise, the HSS continues to operate with the previous values of ScIdx, BitRate[onlyIrapAusFlag? 0: Htid][ScIdx] and CpbSize[onlyIrapAusFlag?*0*: Htid][ScIdx].

When the HSS selects values of BitRate[onlyIrapAusFlag? *0*: Htid][ScIdx] or CpbSize[onlyIrapAusFlag? *0*: Htid][ScIdx] that differ from those of the previous AU, the following applies:

The variable BitRate[onlyIrapAusFlag? *0*: Htid][ScIdx] comes into effect at the initial CPB arrival time of the current AU.

The variable CpbSize[onlyIrapAusFlag? *0*: Htid][ScIdx] comes into effect as follows:

If the new value of CpbSize[onlyIrapAusFlag? *0*: Htid][ScIdx] is greater than the old CPB size, it comes into effect at the initial CPB arrival time of the current AU.

Otherwise, the new value of CpbSize[onlyIrapAusFlag? *0*: Htid][ScIdx] comes into effect at the CPB removal time of the current AU.

C.2.3 Timing of DU Removal and Decoding of DU

The nominal removal time of the AU n from the CPB is specified as follows:

If AU n is the AU with n equal to 0 (the AU that initializes the HRD), the nominal removal time of the AU from the CPB is specified by:

AuNominalRemovalTime[0]=InitCpbRemovalDelay[ScIdx]÷SpeedupFactor÷90000     (1585)

Otherwise, the following applies:

When AU n is the first AU of a BP that does not initialize the HRD, the following applies:

The nominal removal time of the AU n from the CPB is specified by:

```
if( !concatenationFlag ) {
   baseTime = AuNominalRemovalTime[ firstAuInPrevBuffPeriod ]
   tmpCpbRemovalDelay = AuCpbRemovalDelayVal
   tmpCpbDelayOffset = CpbDelayOffset
} else {
   baseTime1 = AuNominalRemovalTime[ prevNonDiscardableAu ]
   tmpCpbRemovalDelay1 = ( auCpbRemovalDelayDeltaMinus1 + 1 )
   baseTime2 = AuNominalRemovalTime[ n − 1 ]
   tmpCpbRemovalDelay2 = Ceil( ( InitCpbRemovalDelay[ ScIdx ] ÷ 90000 +     (1586)
   AuFinalArrivalTime[ n − 1 ] − AuNominalRemovalTime[ n − 1 ] ) ÷ ClockTick )
   if( baseTime1 + ClockTick * ImpCpbRemovalDelay1 <
         baseTime2 + ClockTick * tmpCpbRemovalDelay2 ) {
      baseTime = baseTime2
      tmpCpbRemovalDelay = tmpCpbRemovalDelay2
   } else {
      baseTime = baseTime1
      tmpCpbRemovalDelay = tmpCpbRemovalDelay1
   }
   tmpCpbDelayOffset = 0
}
AuNominalRemovalTime[ n ] = baseTime + ( ClockTick * ImpCpbRemovalDelay ÷ SpeedupFactor
   − ImpCpbDelayOffset)
``` where AuNominalRemovalTime[firstAuInPrevBuffPeriod] is the nominal removal time of the first AU of the previous BP, AuNominalRemovalTime[prevNonDiscardableAu] is the nominal removal time of the previous AU in decoding order with TemporalId equal to 0 that has at least one picture that has ph_non_ref_pic_flag equal to 0 that is not a RASL or RADL picture, AuCpbRemovalDelayVal is the value of CpbRemovalDelayVal[Htid] derived according to pt_cpb_removal_delay_minus1[Htid] and pt_cpb_removal_delay_delta_idx[Htid] in the PT SEI message, and bp_cpb_removal_delay_delta_val[pt_cpb_removal_delay_delta_idx[Htid]] in the BP SEI message, selected as specified in subclause C.1, associated with AU n and concatenationFlag and auCpbRemovalDelayDeltaMinus1 are the values of the syntax elements bp_concatenation_flag and bp_cpb_removal_delay_delta_minus1, respectively, in the BP SEI message, selected as specified in subclause C.1, associated with AU n.

After the derivation of the nominal CPB removal time and before the derivation of the DPB output time of access unit n, the variables DpbDelayOffset and CpbDelayOffset are derived as:

If one or more of the following conditions are true, DpbDelayOffset is set equal to the value of the PT SEI message syntax element pt_nal_dpb_delay_offset[Htid] (when NalHrdModeFlag is equal to 1) or pt_vcl_dpb_delay_offset[Htid] (when NalHrdModeFlag is equal to 0) of AU n+1, and CpbDelayOffset is set equal to the value of the PT SEI message syntax element pt_nal_cpb_delay_offset[Htid] (when NalHrdModeFlag is equal to 1) or pt_vcl_cpb_delay_offset[Htid] (when NalHrdModeFlag is equal to 0) of AU n+1, where the PT SEI message containing the syntax elements is selected as specified in subclause C.1:

UseAltCpbParamsFlag for AU n is equal to 1.
DefaultInitCpbParamsFlag is equal to 0.

Otherwise, DpbDelayOffset and CpbDelayOffset are both set equal to 0.

When AU n is not the first AU of a BP, the nominal removal time of the AU n from the CPB is specified by:

AuNominalRemovalTime[*n*]=AuNominalRemovalTime[firstAuInCurrBuffPeriod]+ClockTick* (AuCpbRemovalDelayVal−CpbDelayOffset)+ SpeedupFactor     (1587)

where AuNominalRemovalTime[firstAuInCurrBuffPeriod] is the nominal removal time of the first AU of the current BP and AuCpbRemovalDelayVal is the value of CpbRemovalDelayVal[OpTid] derived according to pt_cpb_removal_delay_minus1[OpTid] and pt_cpb_removal_delay_delta_idx[OpTid] in the PT SEI message, and bp_cpb_removal_delay_delta_val[pt_cpb_removal_delay_delta_idx[OpTid]] in the BP SEI message, selected as specified in subclause C.1, associated with AU n.

C.6 IRAP AU Sub-Bitstream Extraction Process
5. When onlyIrapAusFlag is equal to 1, remove from outBitstream all NAL units of an AU for which the following applies:
NumLayersInOls[targetOlsIdx] is equal to 1 and *there is at least one VCL NAL unit in the AU having* nal_unit_type not equal to IDR_W_RADL, IDR_NLP or CRA_NUT.
NumLayersInOls[targetOlsIdx] is greater than 1 and no AUD NAL unit with aud_irap_or_gdr_flag equal to 1 is present *in the AU*.

FIG. 1 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 2:
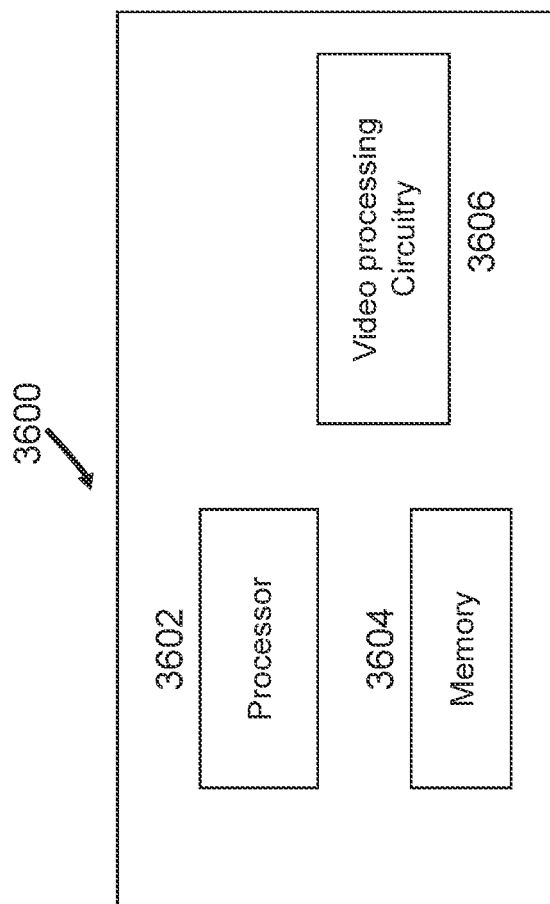
FIG. 2 is a block diagram of a video processing apparatus.

FIG. 2 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and techniques described herein. The video processing hardware 3606 may be used to implement, in hardware circuitry, some techniques described in the present disclosure.

Figure 4:
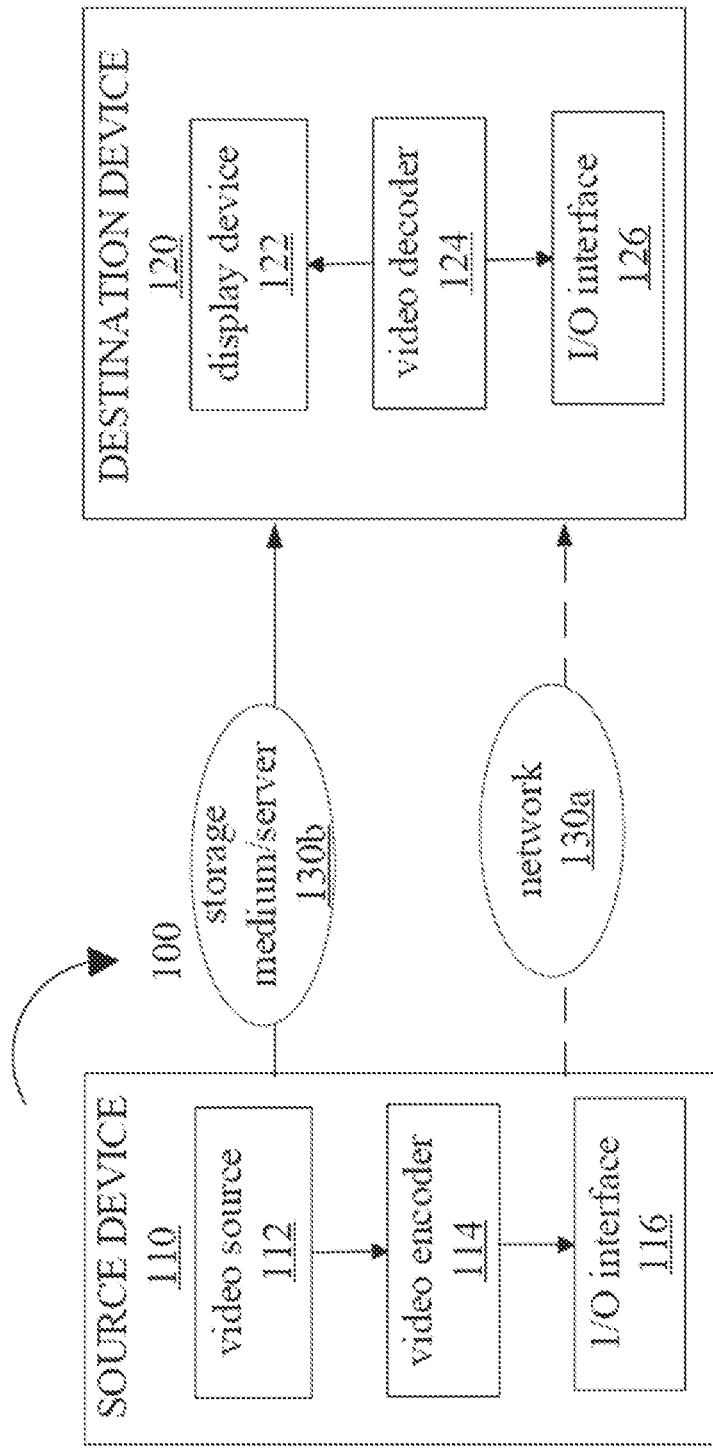
FIG. 4 is a block diagram that illustrates a video coding system in accordance with some embodiments of the present disclosure.

FIG. 4 is a block diagram that illustrates an example video coding system 100 that may utilize the techniques of this disclosure.

As shown in FIG. 4, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 5:
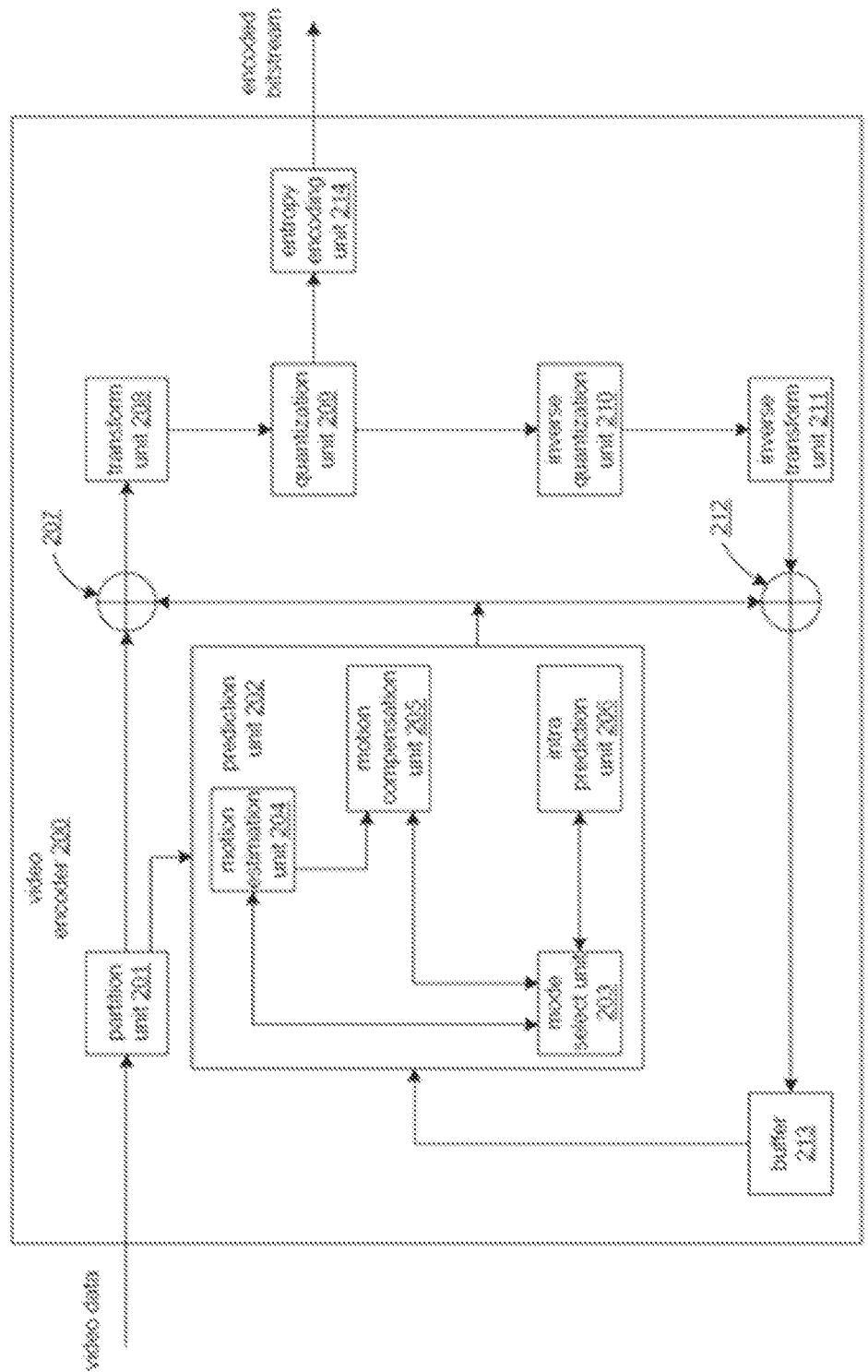
FIG. 5 is a block diagram that illustrates an encoder in accordance with some embodiments of the present disclosure.

FIG. 5 is a block diagram illustrating an example of video encoder 200, which may be video encoder 114 in the system 100 illustrated in FIG. 4.

Video encoder 200 may be configured to perform any or all of the techniques of this disclosure. In the example of FIG. 5, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 6:
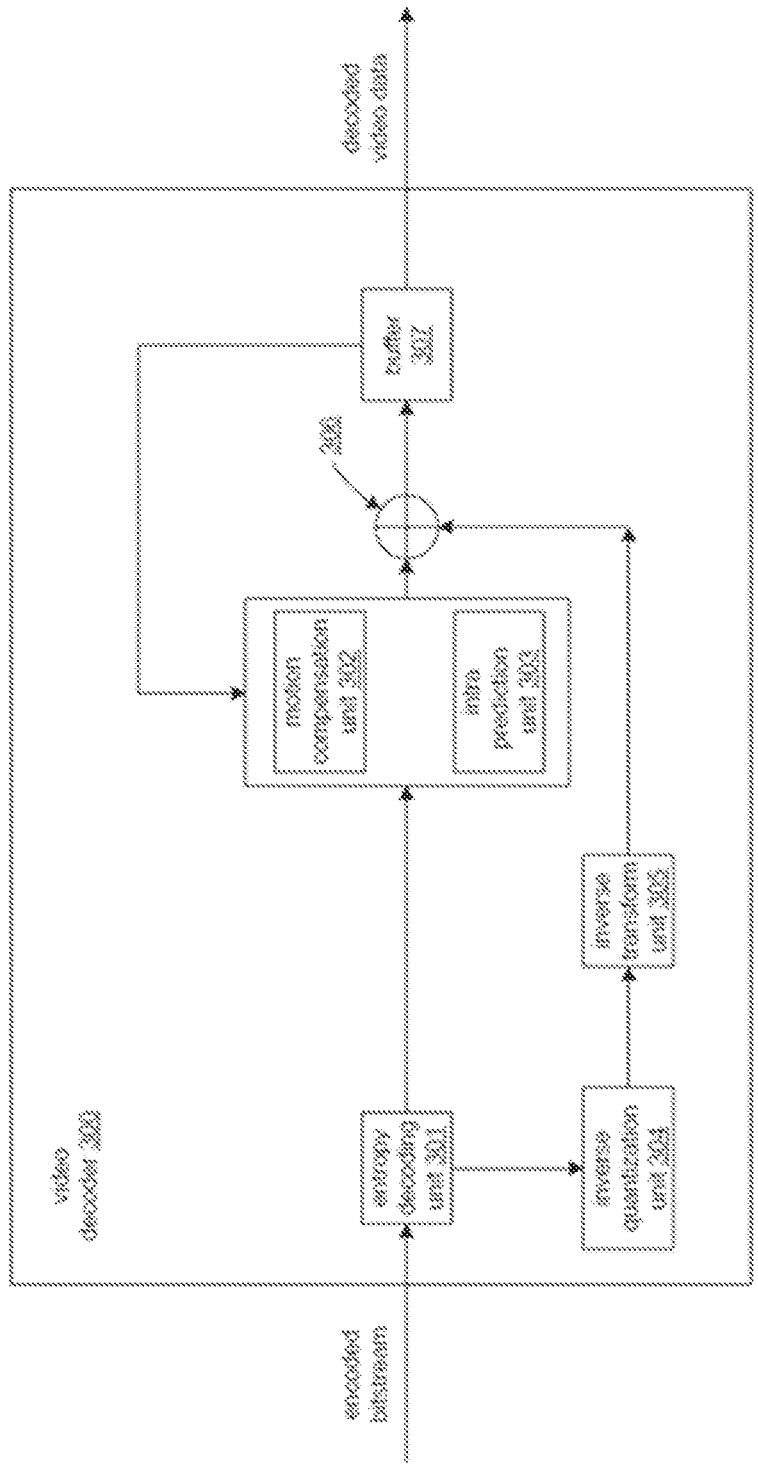
FIG. 6 is a block diagram that illustrates a decoder in accordance with some embodiments of the present disclosure.

FIG. 6 is a block diagram illustrating an example of video decoder 300 which may be video decoder 124 in the system 100 illustrated in FIG. 4.

The video decoder 300 may be configured to perform any or all of the techniques of this disclosure. In the example of FIG. 6, the video decoder 300 includes a plurality of functional components. The techniques described in this disclosure may be shared among the various components of the video decoder 300. In some examples, a processor may be configured to perform any or all of the techniques described in this disclosure.

In the example of FIG. 6, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 5).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of examples preferred by some embodiments is provided next.

The first set of clauses show example embodiments of techniques discussed in the previous section. The following clauses show example embodiments of techniques discussed in the previous section (e.g., item 1).

Figure 3:
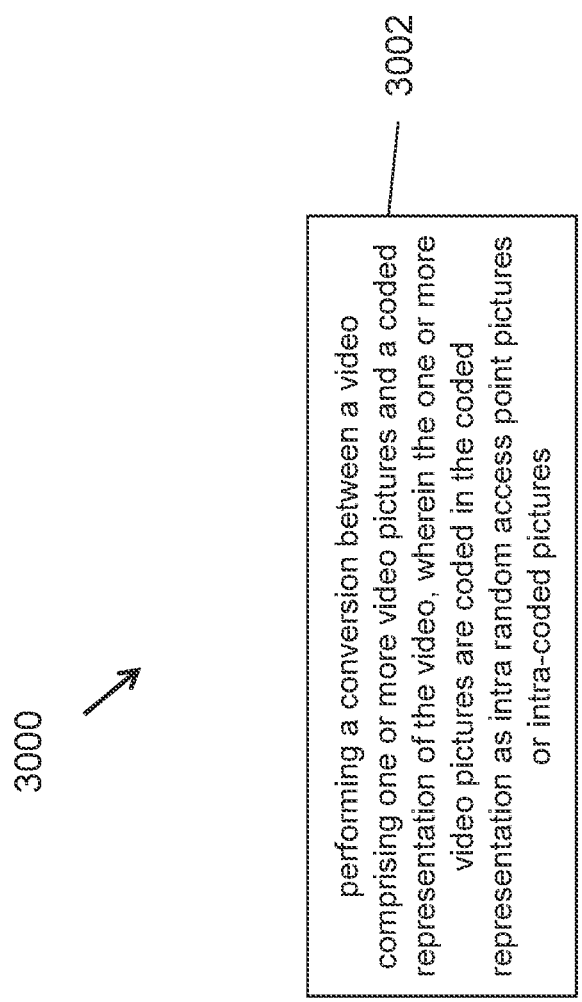
FIG. 3 is a flowchart for an example method of video processing.

1. A video processing method (e.g., method 3000 shown in FIG. 3), comprising performing (3002) a conversion between a video comprising one or more output layer sets (OLS) comprising one or more video pictures and a coded representation of the video, wherein the one or more video pictures are coded in the coded representation as intra random access point pictures or intra-coded pictures, wherein the coded representation conforms to a format rule that specifies a location and a type of information that is included in the coded representation for decoding of the one or more video pictures.

2. The method of clause 1, wherein the format rule specifies that, in case that, all of the one or more pictures are included in the coded representation as intra random access pictures, then level information and/or an indication of presence of level information corresponding to each OLS is included in the coded representation in a first set of syntax elements.

The following clauses show example embodiments of techniques discussed in the previous section (e.g., item 2).

3. The method of any of clauses 1-2, wherein the format rule specifies that, in case that all of the one or more pictures are included in the coded representation using intra-coding only, then level information and/or an indication of presence of level information corresponding to each OLS is included in the coded representation in a second set of syntax elements.

The following clauses show example embodiments of techniques discussed in the previous section (e.g., item 3).

4. The method of any of clauses 2-3, wherein the format rule specifies to include both the first set of syntax elements and the second set of syntax elements in the coded representation.

The following clauses show example embodiments of techniques discussed in the previous section (e.g., item 4).

5. The method of clause 4, wherein the first set of syntax elements and/or the second set of syntax elements are included in a video parameter set or a sequence parameter set.

6. The method of clause 5, wherein the first set of syntax elements and/or the second set of syntax elements are included with a decoding capability information (DCI) syntax structure.

The following clauses show example embodiments of techniques discussed in the previous section (e.g., item 5).

7. The method of clause 5, wherein the first set of syntax elements and/or the second set of syntax elements are included in a profile, tier, and level (PTL) syntax structure.

The following clauses show example embodiments of techniques discussed in the previous section (e.g., item 6).

8. The method of any of clauses 2-7, wherein the format rule further specifies that whether the indication of presence of level information is included in the coded representation controls whether the level information is included.

9. The method of claim 1, wherein the format rule specifies that the indication of presence of level information in the first set of syntax elements and the second set of syntax elements correspond to two different fields.

The following clauses show example embodiments of techniques discussed in the previous section (e.g., item 7).

10. The method of any of clauses 2-9, wherein the format rule further specifies to include hypothetical reference decoder parameters with the first set of syntax elements and/or the second set of syntax elements.

11. A video processing method, comprising: performing a conversion between a video comprising one or more pictures comprising one or more slices that are coded into a coded representation as one or more temporal video layers and the coded representation; wherein the coded representation conforms to a format rule that specifies a constraint on signaling of one or more inter-layer prediction information syntax elements without having to signal a two-dimensional syntax element indicating a maximum temporal layer id of reference pictures used for coding a current video layer and without having to having to directly signal a layer id for the maximum temporal layer id of reference pictures used for coding the current video layer.

12. The method of clause 11, wherein the format rule specifies that a reference picture referred to by each intra layer residual prediction entry in RefPicList[0] or RefPicList[1] of a slice of a current picture is either an intra random access point picture or have TemporalId less than max_tid_il_ref_pics_plus1[currLayerIdx][refLayerIdx], where currLayerIdx and refLayerIdx are equal to GeneralLayerIdx[nuh_layer_id] and GeneralLayerIdx[refpicLayerId], respectively, and refpicLayerId is the nuh_layer_id of the reference picture.

13. The method of clause 11, wherein the format rule specifies that a picture referred to by each ILRP entry in RefPicList[0] or RefPicList[1] of a slice of the current picture shall be present in the DPB, shall have nuh_layer_id refpicLayerId less than the nuh_layer_id of the current picture, and shall either be an TRAP picture or have TemporalId less than max_tid_il_ref_pics_plus1[currLayerIdx][refLayerIdx], where currLayerIdx and refLayerIdx are equal to GeneralLayerIdx[nuh_layer_id] and GeneralLayerIdx[refpicLayerId], respectively.

14. The method of clause 11, wherein the format rule specifies that a reference picture referred to by each ILRP entry in RefPicList[0] or RefPicList[1] of a slice of the current picture shall either be an TRAP picture or have TemporalId less than or equal to Max(0, max_tid_il_ref_pics_plus1[currLayerIdx][refLayerIdx]−1), where currLayerIdx and refLayerIdx are equal to GeneralLayerIdx[nuh_layer_id] and GeneralLayerIdx[refpicLayerId], respectively, and refpicLayerId is the nuh_layer_id of the reference picture.

15. The method of clause 11, wherein the format rule specifies that a picture referred to by each ILRP entry in RefPicList[0] or RefPicList[1] of a slice of the current picture shall be present in the DPB, shall have nuh_layer_id refpicLayerId less than the nuh_layer_id of the current picture, and shall either be an TRAP picture or have TemporalId less than or equal to Max(0, max_tid_il_ref_pics_plus1[currLayerIdx][refLayerIdx]−1), where currLayerIdx and refLayerIdx are equal to GeneralLayerIdx [nuh_layer_id] and GeneralLayerIdx[refpicLayerId], respectively 16. A video processing method, comprising: performing a conversion between a video comprising one or more pictures and a coded representation of the video in which each picture is coded as an intra random access picture according to a rule; wherein the rule specifies an operation of a hypothetical reference decoder for the coded representation uses a value of a maximum sublayers to be equal to zero.

17. The method of clause 16, wherein a speedup factor is signaled in a supplemental enhancement information (SEI) message.

18. The method of any of clauses 1 to 17, wherein the conversion comprises encoding the video into the coded representation.

19. The method of any of clauses 1 to 17, wherein the conversion comprises decoding the coded representation to generate pixel values of the video.

20. A video decoding apparatus comprising a processor configured to implement a method recited in one or more of clauses 1 to 19.

21. A video encoding apparatus comprising a processor configured to implement a method recited in one or more of clauses 1 to 19.

22. A computer program product having computer code stored thereon, the code, when executed by a processor, causes the processor to implement a method recited in any of clauses 1 to 19.

23. A method, apparatus or system described in the present disclosure.

The second set of clauses show example embodiments of techniques discussed in the previous section (e.g., items 1-7, 15 and 16).

Figure 7A:
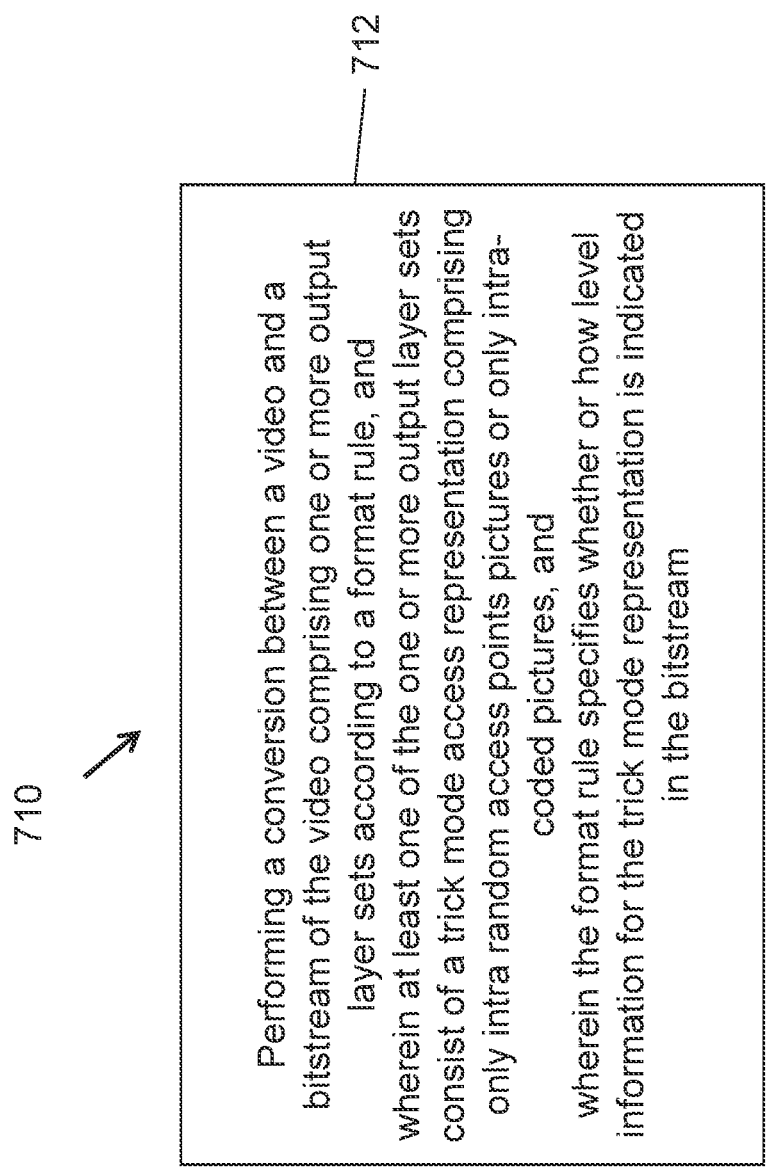

1. A method of video processing (e.g., method 710 as shown in FIG. 7A), comprising: performing 712 a conversion between a video and a bitstream of the video comprising one or more output layer sets according to a format rule, and wherein at least one of the one or more output layer sets consist of a trick mode access representation comprising only intra random access points pictures or only intra-coded pictures, and wherein the format rule specifies whether or how level information for the trick mode representation is indicated in the bitstream.

2. The method of clause 1, wherein the format rule specifies that, in case that at least one of the one or more output layer sets has the track mode access representation comprising only intra random access points pictures, then level information and/or an indication of presence of level information for the track mode access representation is indicated by a first set of syntax elements in a syntax structure.

3. The method of clause 1, wherein the format rule specifies that, in case that at least one of the one or more output layer sets has the track mode access representation comprising only intra-coded pictures, then level information and/or an indication of presence of level information for the track mode access representation is indicated by a second set of syntax elements in a syntax structure.

4. The method of clause 2 or 3, wherein the syntax structure is included in the bitstream.

5. The method of clause 2 or 3, wherein each output layer set includes one or more non-VCL (video coding layer) NAL (network abstraction layer) units associated with the one or more pictures.

6. The method of any of clauses 2-5, wherein the format rule specifies to include both the first set of syntax elements and the second set of syntax elements in the syntax structure.

7. The method of any of clauses 2-6, wherein the syntax structure is a video parameter set or a sequence parameter set.

8. The method of any of clauses 2-6, wherein the syntax structure is a decoding capability information (DCI) syntax structure.

9. The method of any of clauses 2-6, wherein the syntax structure is a supplemental enhancement information (SEI) message.

10. The method of any of clauses 2-6, wherein the syntax structure is a profile, tier, and level (PTL) syntax structure.

11. The method of any of clauses 2-6, wherein the format rule further specifies that whether the level information is included in the syntax structure depends on the indication of presence of level information for one or more track mode access representations.

12. The method of claim 11, wherein the format rule specifies that the indication of presence of level information for the one or more track mode access representations in the first set of syntax elements and the second set of syntax elements correspond to two different fields.

13. The method of clause 11 or 12, wherein the level information for the track mode access representation comprising only intra random access points pictures is signalled separately from the level information for the track mode access representation comprising only intra-coded pictures.

14. The method of clause 11, wherein in case that the indication of the presence of the level information for the one or more track mode access representations specifies that the level information is present, the level information for the one or more track mode access representations is present in a profile, tier, and level (PTL) syntax structure.

15. The method of clause 11, wherein in case that the indication of the presence of the level information for the one or more track mode access representations specifies that the level information is not present, the level information for the one or more track mode access representations is not present in a profile, tier, and level (PTL) syntax structure.

16. The method of clause 11, wherein the format rule specifies that the indication of presence of level information in the first set of syntax elements and the second set of syntax elements correspond to one field.

17. The method of clause 16, wherein the level information is signaled once for both the track mode access representation comprising only intra random access points pictures and the track mode access representation comprising only intra-coded pictures.

18. The method of any of clauses 2-5, wherein the format rule further specifies to include hypothetical reference decoder parameters with the first set of syntax elements and/or the second set of syntax elements.

19. A method of video processing method (e.g., method 720 as shown in FIG. 7B), comprising: performing 722 a conversion between a video comprising one or more pictures and a bitstream of the video, and wherein the bitstream includes trick mode access representation of the one or more output layer sets according to a format rule, wherein the format rule specifies that the trick mode access representation include only intra random access points pictures, and wherein the format rule specifies whether or how a hypothetical reference decoder is operated.

20. The method of clause 19, wherein the format rule specifies that the operation of the hypothetical reference decoder for the bitstream uses a value of a maximum sublayer to be equal to zero.

21. The method of clause 19, wherein the format rule specifies that information about a speedup factor is signaled in a supplemental enhancement information (SEI) message.

22. The method of clause 21, wherein the SEI message includes a syntax element that is used to derive a value of the speedup factor.

23. The method of clause 22, wherein the syntax element corresponds to irap_only_speedup_minusM and the value of the speedup factor is derived as (irap_only_speedup_minusM+M)/M, whereby M is an integer.

24. The method of clause 23, wherein (irap_only_speedup_minusM+M) is not smaller than $2^K-1$, whereby K is an integer.

25. The method of clause 23, wherein the SEI message includes a syntax element that specifies a maximum value of the speedup factor to be applied to hypothetical reference decoder timings of a sub-bitstream corresponding to a intra random access points access unit sequence in a set of coded video sequences of one or more output layer sets of the bitstream to which the SEI message applies.

26. The method of clause 25, wherein the syntax element is signaled with u(k), whereby K is an integer.

27. The method of clause 25, wherein a value of the syntax element is no smaller than 100.

28. The method of clause 21, wherein a syntax element that specifies a maximum value of the speedup factor to be applied to hypothetical reference decoder timings of a sub-bitstream corresponding to a intra random access points access unit sequence in a set of coded video sequences of one or more output layer sets of the bitstream to which the SEI message applies is not present in the bitstream, a value of the syntax element is inferred to be equal to 100.

29. The method of clause 21, wherein a value of the speedup factor is derived to be equal to (irap_only_speedup_minusM+offset)/M, whereby offset and M are integers, and irap_only_speedup_minusM is a syntax element having a value used for a derivation of the speedup factor.

30. The method of clause 29, wherein offset is set to 0 or M/2.

31. The method of any of clauses 1 to 30, wherein the conversion includes encoding the video into the bitstream.

32. The method of any of clauses 1 to 30, wherein the conversion includes decoding the video from the bitstream.

33. The method of clauses 1 to 30, wherein the conversion includes generating the bitstream from the video, and the method further comprises: storing the bitstream in a non-transitory computer-readable recording medium.

34. A video processing apparatus comprising a processor configured to implement a method recited in any one or more of clauses 1 to 33.

35. A method of storing a bitstream of a video, comprising, a method recited in any one of clauses 1 to 34, and further including storing the bitstream to a non-transitory computer-readable recording medium.

36. A computer readable medium storing program code that, when executed, causes a processor to implement a method recited in any one or more of clauses 1 to 34.

37. A computer readable medium that stores a bitstream generated according to any of the above described methods.

38. A video processing apparatus for storing a bitstream representation, wherein the video processing apparatus is configured to implement a method recited in any one or more of clauses 1 to 34.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
    performing a conversion between a video and a bitstream of the video comprising one or more output layer sets according to a format rule, and
    wherein at least one of the one or more output layer sets comprise a trick mode representation comprising intra random access points (IRAP)-only representation or intra-only representation, wherein the IRAP-only representation comprises only IRAP pictures and one or more non-video coding layer (VCL) network abstraction layer (NAL) units associated with the IRAP pictures, and wherein the intra-only representation comprises only intra-coded pictures and one or more non-VCL NAL units associated with the intra-coded pictures, and
    wherein the format rule specifies whether or how level information for the trick mode representation is indicated in the bitstream.

2. The method of claim 1, wherein the format rule specifies that, the level information and/or an indication of presence of the level information for the trick mode representation is indicated by one or more syntax elements in a syntax structure included in the bitstream.

3. The method of claim 2, wherein the syntax structure is a video parameter set, a sequence parameter set, a decoding capability information (DCI) syntax structure, a supplemental enhancement information (SEI) message, or a profile, tier, and level (PTL) syntax structure.

4. The method of claim 2, wherein the format rule further specifies to include hypothetical reference decoder parameters with the one or more syntax elements.

5. The method of claim 2, wherein the format rule further specifies that whether the level information is included in the syntax structure depends on the indication of presence of level information for the trick mode representation.

6. The method of claim 2, wherein the one or more syntax elements comprises sublayer_level_present_flag[i],
    wherein the sublayer_level_present_flag[i] being equal to 1 specifies that:
    when i is greater than 0, the level information is present in a profile_tier_level( ) syntax structure for a sublayer representation with TemporalId equal to i−1, and
    when i is equal to 0, the level information is present in the profile_tier_level( ) syntax structure for the TRAP-only representation.

7. The method of claim 6, wherein the sublayer_level_present_flag[i] being equal to 0 specifies that:
    when i is greater than 0, the level information is not present in the profile_tier_level( ) syntax structure for the sublayer representation with the TemporalId equal to i−1, and
    when i is equal to 0, the level information is not present in the profile_tier_level( ) syntax structure for the TRAP-only representation.

8. The method of claim 2, wherein the one or more output layer sets comprise the trick mode representation comprising IRAP-only representation, and the trick mode representation comprising intra-only representation, and
    wherein the format rule specifies that the indication of presence of level information for the trick mode representations comprising IRAP-only representation and for the trick mode representation comprising intra-only representation correspond to one field.

9. The method of claim 8, wherein the one or more syntax elements comprises sublayer_level_present_flag[i],
    wherein the sublayer_level_present_flag[i] being equal to 1 specifies that:

when i is greater than 1, the level information is present in a profile_tier_level( ) syntax structure for a sublayer representation with TemporalId equal to i−2, when i is equal to 1, the level information is present in the profile_tier_level( ) syntax structure for the intra-only representation, and when i is equal to 0, the level information is present in the profile_tier_level( ) syntax structure for the IRAP-only representation.

10. The method of claim 9, wherein the sublayer_level_present_flag[i] being equal to 0 specifies that:

when i is greater than 1, the level information is not present in the profile_tier_level( ) syntax structure for the sublayer representation with TemporalId equal to i−2, when i is equal to 1, the level information is not present in the profile_tier_level( ) syntax structure for the intra-only representation; and when i is equal to 0, the level information is not present in the profile_tier_level( ) syntax structure for the IRAP-only representation.

11. The method of claim 2, wherein the one or more syntax elements comprises sublayer_level_idc[i], wherein the sublayer_level_idc[i] applies to a sublayer representation with TemporalId equal to i−1 when i is greater than 0, and applies to the IRAP-only representation when i is equal to 0.

12. The method of claim 1, wherein the one or more output layer sets comprise the trick mode representation comprising IRAP-only representation, and the trick mode representation comprising intra-only representation, and wherein the level information for the trick mode representation comprising IRAP-only representation is included separately from the level information for the trick mode representation comprising intra-only representation.

13. The method of claim 1, wherein the one or more output layer sets comprise the trick mode representation comprising IRAP-only representation, and the trick mode representation comprising intra-only representation, and wherein the level information is included in the bitstream once for both the trick mode representation comprising IRAP-only representation and the trick mode representation comprising intra-only representation.

14. The method of claim 1, wherein the conversion includes encoding the video into the bitstream.

15. The method of claim 1, wherein the conversion includes decoding the video from the bitstream.

16. An apparatus for processing video data comprising a processor and a non-transitory memory with instructions thereon, wherein the instructions upon execution by the processor, cause the processor to:

performing a conversion between a video and a bitstream of the video comprising one or more output layer sets according to a format rule, and wherein at least one of the one or more output layer sets comprise a trick mode representation comprising IRAP (intra random access points)-only representation or intra-only representation, wherein the IRAP-only representation comprises only IRAP pictures and one or more non-VCL (video coding layer) NAL (network abstraction layer) units associated with the IRAP pictures, and wherein the intra-only representation comprises only intra-coded pictures and one or more non-VCL NAL units associated with the intra-coded pictures, and wherein the format rule specifies whether or how level information for the trick mode representation is indicated in the bitstream.

17. The apparatus of claim 16, wherein the format rule specifies that, the level information and/or an indication of presence of level information for the trick mode representation is indicated by one or more syntax elements in a syntax structure included in the bitstream;

wherein the syntax structure is a video parameter set, a sequence parameter set, a decoding capability information (DCI) syntax structure, a supplemental enhancement information (SEI) message, or a profile, tier, and level (PTL) syntax structure.

18. A non-transitory computer-readable storage medium storing instructions that cause a processor to:

performing a conversion between a video and a bitstream of the video comprising one or more output layer sets according to a format rule, and wherein at least one of the one or more output layer sets comprise a trick mode representation comprising TRAP (intra random access points)-only representation or intra-only representation, wherein the TRAP-only representation comprises only IRAP pictures and one or more non-VCL (video coding layer) NAL (network abstraction layer) units associated with the IRAP pictures, and wherein the intra-only representation comprises only intra-coded pictures and one or more non-VCL NAL units associated with the intra-coded pictures, and wherein the format rule specifies whether or how level information for the trick mode representation is indicated in the bitstream.

19. The non-transitory computer-readable storage medium of claim 18, wherein the format rule specifies that, the level information and/or an indication of presence of level information for the trick mode representation is indicated by one or more syntax elements in a syntax structure included in the bitstream;

wherein the syntax structure is a video parameter set, a sequence parameter set, a decoding capability information (DCI) syntax structure, a supplemental enhancement information (SEI) message, or a profile, tier, and level (PTL) syntax structure.

20. A method for storing a bitstream of a video, comprising:

generating the bitstream, for the video, according to a format rule, and storing the bitstream in a non-transitory computer-readable recording medium, wherein the bitstream comprises one or more output layer sets, wherein at least one of the one or more output layer sets comprise a trick mode representation comprising TRAP (intra random access points)-only representation or intra-only representation, wherein the TRAP-only representation comprises only IRAP pictures and one or more non-VCL (video coding layer) NAL (network abstraction layer) units associated with the IRAP pictures, and wherein the intra-only representation comprises only intra-coded pictures and one or more non-VCL NAL units associated with the intra-coded pictures, and wherein the format rule specifies whether or how level information for the trick mode representation is indicated in the bitstream.

* * * * *